US012703835B2

(12) United States Patent
He et al.

(10) Patent No.: US 12,703,835 B2
(45) Date of Patent: Aug. 11, 2026

(54) AROMATIC AND AROMATIC-LIKE CONTAINING MEDIA LUBRICANTS FOR DATA STORAGE DEVICES

(71) Applicant: Western Digital Technologies, Inc., San Jose, CA (US)

(72) Inventors: Xingliang He, Fremont, CA (US); Jianming Wen, Pleasanton, CA (US); Charles Cheng-Hsing Lee, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 199 days.

(21) Appl. No.: 18/230,584

(22) Filed: Aug. 4, 2023

(65) Prior Publication Data

US 2024/0158711 A1 May 16, 2024

Related U.S. Application Data

(60) Provisional application No. 63/414,325, filed on Oct. 7, 2022.

(51) Int. Cl.
*C10M 107/38* (2006.01)
*C08G 65/26* (2006.01)
(Continued)

(52) U.S. Cl.
CPC ....... *C10M 107/38* (2013.01); *C08G 65/2612* (2013.01); *G11B 5/012* (2013.01);
(Continued)

(58) Field of Classification Search
None
See application file for complete search history.

(56) References Cited

U.S. PATENT DOCUMENTS 6,099,937 A 8/2000 Gui et al.
6,731,446 B2 5/2004 Ikeda et al.
(Continued)

FOREIGN PATENT DOCUMENTS

EP 3555174 A1 10/2019
JP 2009270093 A 11/2009
(Continued)

OTHER PUBLICATIONS

Guo et al., "A multidentate lubricant for use in hard disk drives at sub-nanometer thickness"; Journal of Applied Physics, 2012; https://aip.scitation.org/doi/10.1063/1.3677984; 8 pages.
(Continued)

*Primary Examiner* — Ha S Nguyen
(74) *Attorney, Agent, or Firm* — LOZA & LOZA, LLP; Gabriel Fitch

(57) ABSTRACT

An aromatic or aromatic-like group(s) containing lubricant configured to be adsorbed by a magnetic recording media is formed from $$(Ar)_m(R1_oR_fR2_p)_q$$

where Ar is an aromatic group, polyaromatic hydrocarbon (PAH), annulene, cycloalkane or heterocycle, m=1-10, R1 and R2 are moieties containing first and second polar groups, respectively, $R_f$ is a perfluorinated polyether, o=1-10, p=0-10, and q=1-10. The first or second polar group may independently be hydroxyl, phosphonic acid, silanol or carboxylic acid. In an embodiment, the lubricant has the formula:

(Continued)

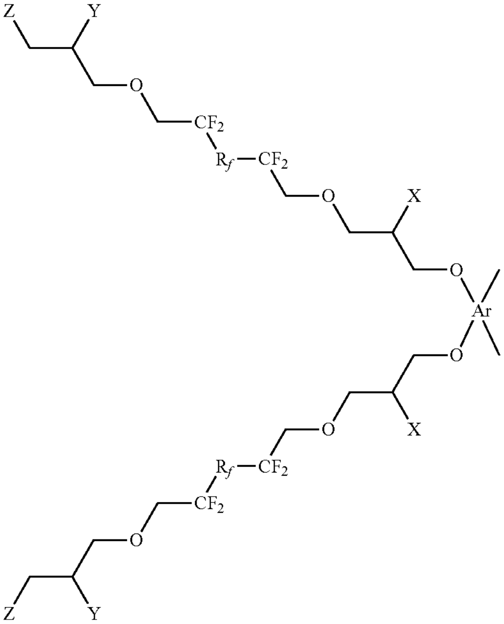

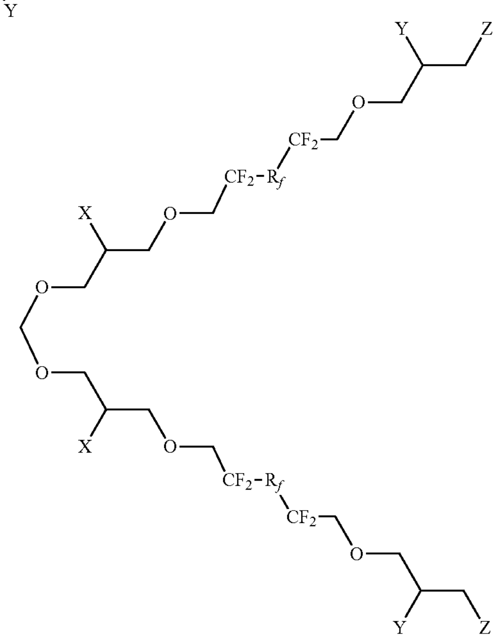

where Ar is a system formed from a PAH, annulene, cycloalkane or heterocycle, X, Y and Z can independently be hydroxyl, a phosphonic acid moiety, a silanol or a carboxylic acid moiety, and where $R_f$ may be $CF_2O(CF_2CF_2)_nCF_2$— where n is 1 to 100. Synthesizing the lubricant may entail reacting parabromophenol with $(Ar)_m(R1_oR_fR2_p)_q$.

25 Claims, 6 Drawing Sheets

(51) Int. Cl.
*C10M 147/04* (2006.01)
*C10N 30/06* (2006.01)
*C10N 40/18* (2006.01)
*G11B 5/00* (2006.01)
*G11B 5/012* (2006.01)
*G11B 5/725* (2006.01)

(52) U.S. Cl.
CPC . *C10M 2213/0606* (2013.01); *C10N 2040/18* (2013.01); *G11B 2005/0021* (2013.01)

(56) References Cited

U.S. PATENT DOCUMENTS 7,715,302 B2 5/2010 Ohta et al.
8,178,480 B2 5/2012 Hamakubo et al.
8,787,130 B1 7/2014 Yuan et al.
9,117,475 B2 8/2015 Nakata et al.
9,382,496 B1 7/2016 Knigge et al.
9,466,322 B2 10/2016 Deng et al.
9,598,657 B2 3/2017 Isobe et al.
10,262,685 B2 4/2019 Pathem
10,373,632 B2 8/2019 Brand et al.
10,766,844 B2 9/2020 Valsecchi et al.
10,899,883 B2 1/2021 Galimberti et al.
10,947,476 B2 3/2021 Lu et al.
11,011,200 B2 5/2021 Uetake et al.
2002/0119316 A1 8/2002 Shukla et al.
2003/0176629 A1 9/2003 Blomquist et al.
2003/0181633 A1 9/2003 Blomquist et al.
2003/0185986 A1 10/2003 Ma et al.
2005/0031907 A1 2/2005 Matsuyama
2006/0229217 A1 10/2006 Liu et al.
2007/0060487 A1 3/2007 Burns et al.
2010/0035083 A1 2/2010 Yang et al.
2011/0117386 A1 5/2011 Li et al.
2012/0097194 A1 4/2012 Mcdaniel et al.
2012/0219826 A1 8/2012 Li et al.
2012/0231297 A1* 9/2012 Sugiura ................ C10M 107/38 428/836
2012/0251843 A1 10/2012 Yan et al.
2013/0161181 A1 6/2013 Guo et al.
2014/0234666 A1 8/2014 Knigge et al.
2015/0235664 A1 8/2015 Deng et al.
2015/0275352 A1 10/2015 Ng et al.
2015/0361212 A1 12/2015 Takahashi et al.
2016/0068778 A1 3/2016 Conley et al.
2016/0260452 A1 9/2016 Pathem
2016/0329074 A1 11/2016 Karis et al.
2017/0081266 A1 3/2017 Valsecchi et al.
2017/0260472 A1 9/2017 Sagata et al.
2018/0233167 A1 8/2018 Sakane et al.
2018/0268853 A1 9/2018 Shimokawa et al.
2019/0084911 A1* 3/2019 Yagyu .................. C07D 277/24
2019/0352573 A1 11/2019 Hatta et al.
2020/0010619 A1* 1/2020 Minami ............. C08G 59/3236
2022/0154093 A1 5/2022 Pathem et al.
2022/0220406 A1 7/2022 Pathem et al.
2022/0282176 A1 9/2022 He et al.
2022/0290066 A1 9/2022 He et al.
2022/0315514 A1 10/2022 Shimizu et al.
2022/0364008 A1 11/2022 Pathem et al.
2022/0380695 A1* 12/2022 Fukumoto ............... C07C 43/23

FOREIGN PATENT DOCUMENTS

JP 4654339 B2 3/2011
KR 20100067037 A 6/2010
WO 2015/182321 A1 12/2015
WO 2017/099075 A1 6/2017
WO WO-2017154403 A1 * 9/2017 ........... C07D 409/12
WO WO-2018159232 A1 * 9/2018 ......... C08G 59/1494
WO 2021002178 A1 1/2021
WO 2021019998 A1 2/2021
WO WO-2021065380 A1 * 4/2021 ........... G11B 5/7257

OTHER PUBLICATIONS

Guo et al., "Multidentate functionalized lubricant for ultralow head/disk spacing in a disk drive"; Journal of Applied Physics; 2006; https://www.researchgate.net/publication/252269467_

(56) References Cited

OTHER PUBLICATIONS

Multidentate_functionalized_lubricant_for_ultralow_headdisk_spacing_in_a_disk_drive; 9 pages.
Marchon et al., "Fomblin Multidentate Lubricants for Ultra-Low Magnetic Spacing"; IEEE Transactions on Magnetics; vol. 42, No. 10; Oct. 2006; https://ieeexplore.ieee.org/document/1704346; 4 pages.
Marchon, Bruno, "Lubricant Design Attributes for Subnanometer Head-Disk Clearance"; IEEE Transactions on Magnetics; vol. 45, No. 2; Feb. 2009; https://ieeexplore.ieee.org/document/4782079?reload=true; 6 pages.
Rhew et al., "Thermal Stability of Modified Perfluoropolyether Lubricants for Application in Heat Assisted Magnetic Recording"; Proceedings of the ASME/STLE 2011 International Joint Tribology Conference; 2011; https://doi.org/10.1115/IJTC2011-61044; 2 pages.
Jones et al., "Laser-Induced Thermo-Desorption of Perfluoropolyether Lubricant from the Surface of a Heat-Assisted Magnetic Recording Disk: Lubricant Evaporation and Diffusion"; ResearchGate; Jul. 1, 2015; https://www.researchgate.net/publication/281528079_Laser-Induced_Thermo-Desorption_of_Perfluoropolyether_Lubricant_from_the_Surface_of_a_Heat-Assisted_Magnetic_Recording_Disk_Lubricant_Evaporation_and_Diffusion; 7 pages.
Wu, Lin, "Modelling and simulation of the lubricant depletion process induced by laser heating in heat-assisted magnetic recording system"; IOP Publishing: Nanotechnology; vol. 18, No. 21; Apr. 27, 2007; https://iopscience.iop.org/article/10.1088/0957-4484/18/21/215702/pdf, 9 pages.
Zhang et al., "Lubrication for Heat-Assisted Magnetic Recording Media"; IEEE Transactions on Magnetics; vol. 42, Issue 10, Oct. 2006; https://ieeexplore.ieee.org/document/1704360; 3 pages.
International Search Report and Written Opinion for International Application No. PCT/US2021/041499, dated Sep. 9, 2021, 13 pages.
International Search Report and Written Opinion for International Application No. PCT/US2021/041500, dated Sep. 14, 2021, 15 pages.
Brunner, Ralf, "Properties of Carbon Overcoats and Perfluoro-Polyether Lubricants in Hard Disk Drives"; Ph.D Dissertation; University of California, San Diego; 2009; https://escholarship.org/uc/item/24w0q2v0; 248 pages.

* cited by examiner

PAH: Naphthalene

Phenalene

Phenanthrene

Pyrene

Triphenylene etc.

AROMATIC AND AROMATIC-LIKE CONTAINING MEDIA LUBRICANTS FOR DATA STORAGE DEVICES

CROSS REFERENCE TO RELATED APPLICATIONS

This application claims priority to and the benefit of Provisional Patent Application No. 63/414,325 entitled "AROMATIC AND AROMATIC-LIKE CONTAINING MEDIA LUBRICANTS FOR DATA STORAGE DEVICES" and filed in the United States Patent & Trademark Office on Oct. 7, 2022, the entire content of which is incorporated herein by reference as if fully set forth below in its entirety and for all applicable purposes.

FIELD

The disclosure is directed to lubricants, and more particularly, to lubricants incorporating aromatic moieties, where the lubricants are suitable for use in various applications, including magnetic recording media.

INTRODUCTION

The disclosure relates to lubricants suitable for use in magnetic storage media, and in particular, media configured for high energy recording such as heat assisted magnetic recording (HAMR), energy assisted magnetic recording (EAMR) or microwave assisted magnetic recording (MAMR). Magnetic storage systems, such as hard disk drive (HDD) systems, are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main components, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disks. High energy recording such as HAMR increases the areal density (AD) of written data on a magnetic storage medium having high coercivity using high recording temperatures to write information to the medium. However, the high recording energy, microwaves or temperatures applied to the media may present challenges. Other examples of magnetic storage media include flexible tape media usable for magnetic tape recording.

One challenge arises from the layer of lubricant that separates the outer layer of the disk from the recording head. The separation of the slider (e.g., encompassing the recording head) from the disk is often less than 10 nm. As such, the lubricant often must be low profile. However, as the molecular weight of the lubricant backbone is reduced to a range of 100 to 10,000 Da for gaining magnetic spacing and for decreasing head-disk clearance, the vapor pressure of the lubricant molecules increases exponentially. This will significantly increase desorption rate of the molecules and lubricant loss risk, ultimately resulting in the great instability of a sub-monolayer thick lubricant film.

That is, it is desired that the lubricant stay bonded on the disk stably and not be effortlessly evaporated into the environment of the HDD. Such media lubricant loss and/or the film stability degradation will endanger reliability, quality, and endurance of the component integrations of disk media with the head, thereby reducing overall performance of the actual HDD products. In addition, loss of the safeguard against disintegration of the necessary mechanical and chemical robustness, if the lubricant is disjoined from the disk surface, degraded and/or oxidized, can cause the HDD to crash rapidly.

As a result of the high temperatures up to 300-600° C. associated with the head-media interface designs in a HAMR HDD, suitable lubricants for use in the corresponding media may benefit from high thermal stability and high oxidation resistance. In addition, the higher temperatures also increase the presence of contaminants which may negatively affect performance, reliability, and durability of the HAMR drives. As such, there is a need in the art for high-temperature lubricants having properties suitable for use in HAMR drives, including the ability to sequester and/or remove contaminants prior to the contaminants interfering with data storage or other operational processes.

A typical HDD operating temperature range is in the about 25° C. to about 45° C. range. A standard HDD storage temperature is between about 12° C. and about 33° C. HDD temperatures higher than about 45° C. lead to higher failure rates. Temperatures lower than about 25° C. also lead to higher failure rates. Moreover, aging HDD drives (3 years and older) are much more prone to failure when their average operating temperatures are 40° C. and higher.

The temperature dependence on annual failure rate (AFR) is known in the art, as was observed by E. Pinheiro et al., Proc. $5^{th}$ USENIX Conference on File and Storage Technologies (FAST '07), February 2007. FIG. 6 shows the study's observation of the distribution of average temperatures and failure rates. As can be seen, the AFR increases as the average disk temperature lies outside of the about 25° C. to about 45° C. range, most notably at lower temperatures. The age of the HDD is also a factor. FIG. 7 shows the study's AFR based on both age and temperature. After breaking in, the AFR is relatively stable until the 3 year mark is reached, and then the AFR dramatically increases, especially at elevated temperatures.

There is thus a need in the art to design thermally stable/oxidation-resistant lubricant thin films having specific properties suitable for utilization in HDDs over wide and extreme temperature ranges.

SUMMARY

In one aspect, the disclosure provides a lubricant configured to be adsorbed by a magnetic recording medium such as a disk of a hard disk drive, including a polyaromatic carbon moiety bonded to a perfluorinated polyether grafted with —OH containing functional groups.

In one aspect, the lubricant is configured to be adsorbed by a magnetic recording medium and may be formed from:

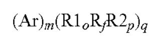

$$(Ar)_m(R1_oR_fR2_p)_q$$

where

Ar is an aromatic group, a polyaromatic hydrocarbon (PAH), an annulene, a cycloalkane, or a heterocycle, m is from Ito 10

R1 is a moiety containing a first polar group,

R2 is a moiety containing a second polar group, $R_f$ is a perfluorinated polyether, is from 1 to 10 p is from 0 to 10, and q is from 1 to 10.

The value for p may be from 1 to 10. The first polar group may be at least one selected from hydroxyl, phosphonic acid, silanol or carboxylic acid, and the second polar group may be at least one selected from hydroxyl, phosphonic acid, silanol or carboxylic acid. $R_f$ may be $—CF_2CF_2O(CF_2CF_2CF_2CF_2O)_sCF_2CF_2—$, $CF_2CF_2O(CF_2CF_2CF_2O)_sCF_2CF_2$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s may be independently from 1 to 100. Alternately, $R_f$ may be $—CF_2O(CF_2CF_2O)_qCF_2—$, and q is from 1 to 100. Ar may be selected from aromatic groups, polycyclic aromatic hydrocarbons (PAH) like naphthalene, phenalene, phenanthrene, pyrene, triphenylene, annulenes like cyclooctatetraene, cyclooctadecanonaene, cycloalkanes like cyclohexane, cyclooctane, cyclodecane, and other heterocycles like triazine, cyclen, cyclam, or cyclotriphosphazene.

In one aspect, the lubricant may have a PAH aromatic central group and aromatic end groups of the formula:

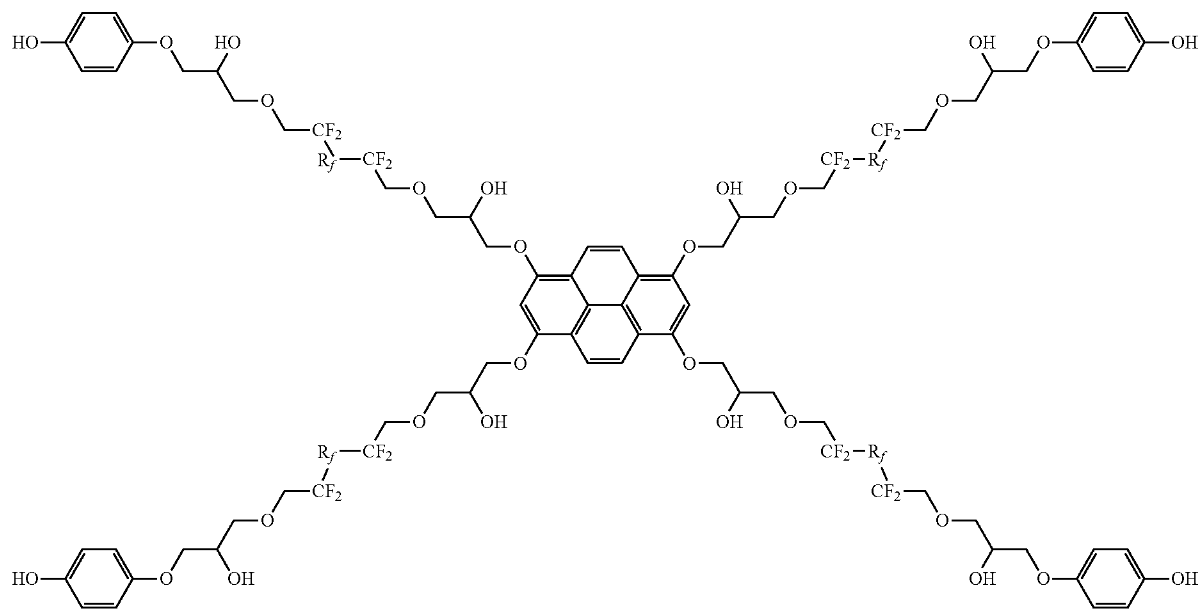

where $R_f$ is $CF_2O(CF_2CF_2)_nCF_2—$ where n is from 1 to 100 or $R_f$ may be $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

In another aspect, the lubricant may have a PAH central group and aromatic end groups of the formula:

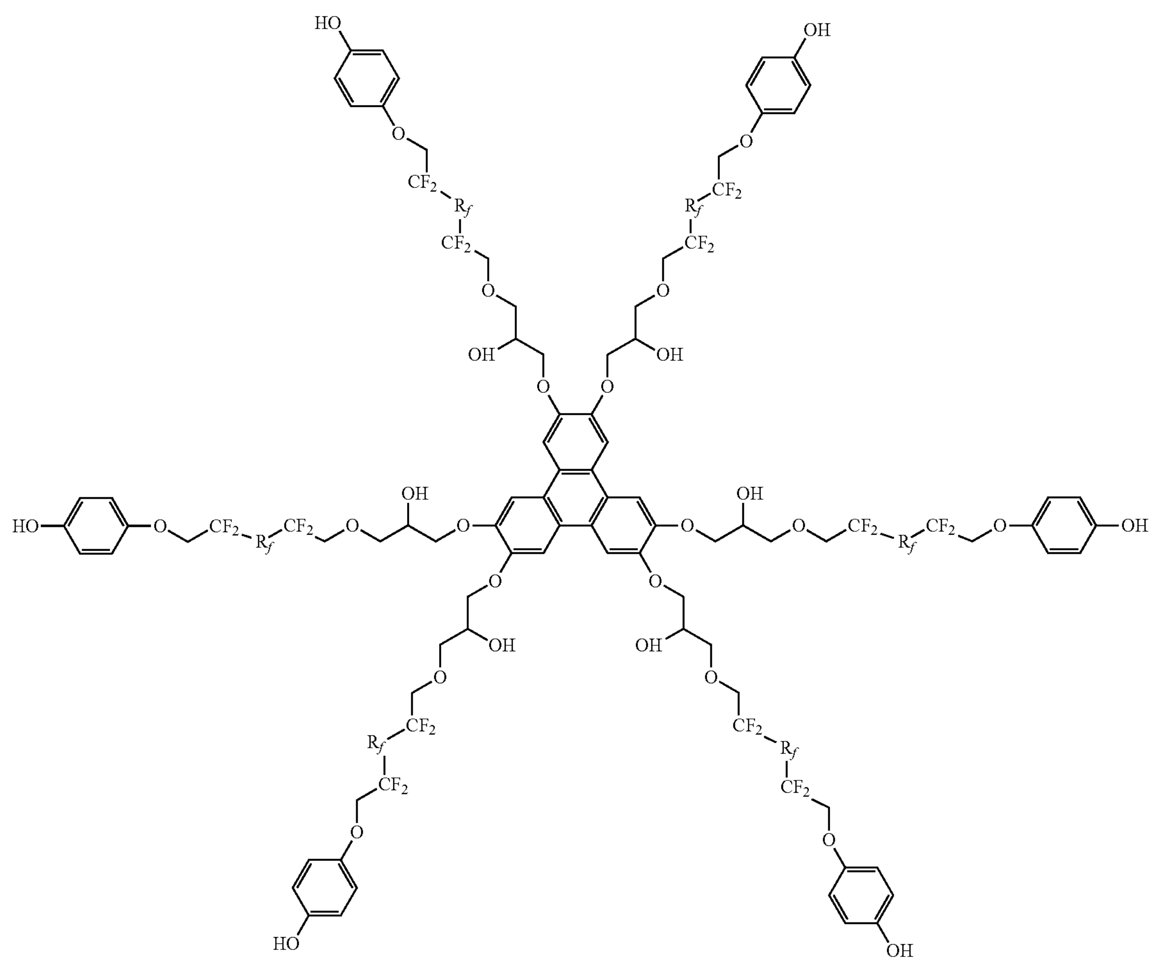

where $R_f$ is $CF_2O(CF_2CF_2)_nCF_2$— where n is from 1 to 100 or $R_f$ may be $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

The disclosure, in part, pertains to a data storage device configured for magnetic recording, that includes a magnetic recording medium formed from a substrate, a magnetic recording layer on the substrate, an overcoat layer on the magnetic recording layer; and a lubricant of an aspect of the disclosure adsorbed by the overcoat layer. In the data storage device, $R_f$ may be $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100, or $R_f$ may be $—CF_2O(CF_2CF_2O)_qCF_2—$, and q is from 1 to 100. Ar may be selected from aromatic groups, PAH like naphthalene, phenalene, phenanthrene, pyrene, triphenylene, annulenes like cyclooctatetraene, cyclooctadecanonaene, cycloalkanes like cyclohexane, cyclooctane, cyclodecane, and other heterocycles like triazine, cyclen, cyclam, or cyclotriphosphazene.

In the data storage device, the lubricant may have the formula:

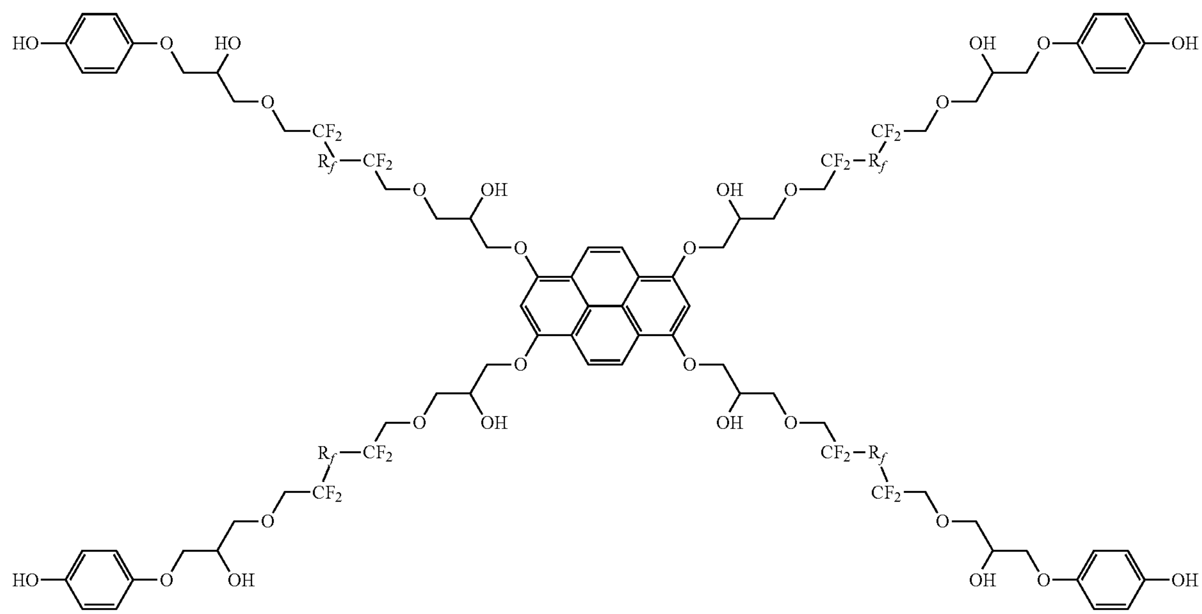
where $R_f$ may be $CF_2O(CF_2CF_2)_nCF_2$— where n is from 1 to 100 or $R_f$ may be $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.
In the data storage device, the lubricant may have the formula:
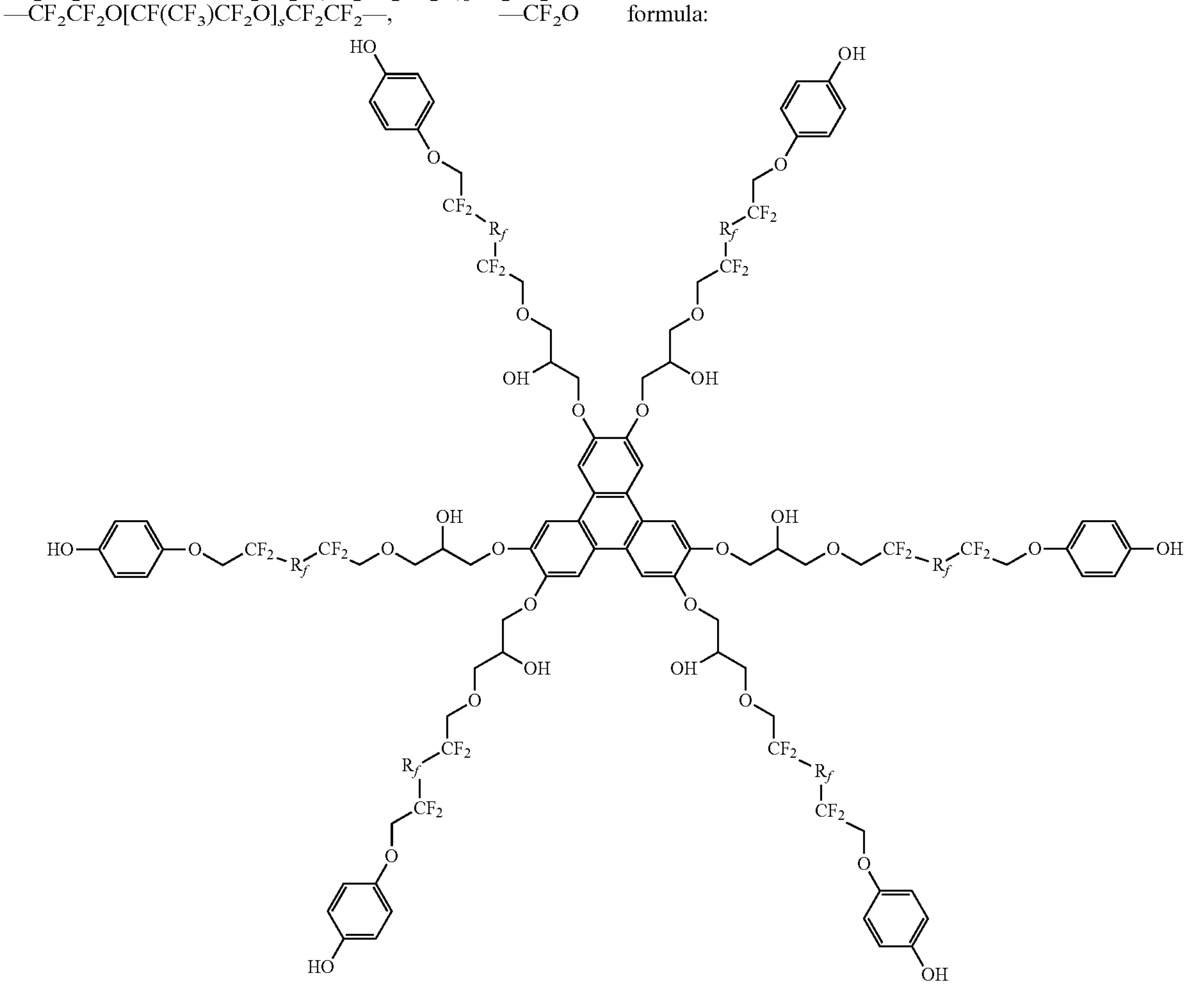

where $R_f$ may be $CF_2O(CF_2CF_2)_nCF_2$— where n is from 1 to 100, or $R_f$ may be —$CF_2CF_2O(CF_2CF_2CF_2CF_2O)_sCF_2CF_2$—, —$CF_2CF_2O(CF_2CF_2CF_2O)_sCF_2CF_2$—, —$CF_2CF_2O[CF(CF_3)CF_2O]_sCF_2CF_2$—, —$CF_2O(CF_2CF_2O)_r(CF_2O)_sCF_2$—, or —$CF_2O(CF_2CF_2O)_sCF_2$—, and r, s are independently from 1 to 100.

In another exemplary embodiment, a magnetic recording medium includes a substrate, a magnetic recording layer on the substrate, an overcoat layer on the magnetic recording layer, and the lubricant according to an aspect of the disclosure adsorbed by the overcoat layer.

In another exemplary embodiment, a data storage system includes at least one magnetic head, a magnetic recording medium coated with a layer of a lubricant according to an aspect of the disclosure, a drive mechanism for positioning the at least one magnetic head over the magnetic recording medium, and a controller electrically coupled to the at least one magnetic head for controlling operation of the at least one magnetic head.

In another exemplary embodiment, a data storage system includes a slider having at least one magnetic head and an air bearing surface (ABS), where a thin film of the lubricant according to an aspect of the disclosure is disposed on the ABS; and a magnetic recording medium including a magnetic recording layer. The slider is configured to write information to the magnetic recording layer using heat assisted magnetic recording (HAMR), energy assisted magnetic recording (EAMR), or microwave assisted magnetic recording (MAMR).

In another exemplary embodiment, a lubricant is configured to be adsorbed by a magnetic recording medium, where the lubricant has the formula:

dently from 1 to 100. The aromatic center can be aromatic groups, PAH like naphthalene, phenalene, phenanthrene, pyrene, triphenylene, annulenes like cyclooctatetraene, cyclooctadecanonaene, cycloalkanes, cyclohexane, cyclooctane, cyclodecane, and other heterocycles like triazine, cyclen, cyclam, or cyclotriphosphazene, or any of the aromatic and aromatic-like molecules set forth in Table 1.

In an exemplary embodiment, the disclosure pertains to a method of synthesizing a lubricant, which includes:

reacting parabromophenol with where

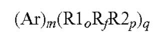

Ar is an aromatic group, a polyaromatic hydrocarbon, an annulene, a cycloalkane, or a heterocycle, m is from 1 to 10

R1 is a moiety containing a first polar group,

R2 is a moiety containing a second polar group, $R_f$ is a perfluorinated polyether, is from 1 to 10, p is from 0 to 10, and q is from 1 to 10. The value for p may also be from 1 to 10.

In the method, $R_f$ may be $CF_2O(CF_2CF_2)_nCF_2$— where n is from 1 to 100, or $R_f$ may be —$CF_2CF_2O(CF_2CF_2CF_2CF_2O)_sCF_2CF_2$—, —$CF_2CF_2O(CF_2CF_2CF_2O)_s CF_2CF_2$—, —$CF_2CF_2O[CF(CF_3)CF_2O]_sCF_2CF_2$—, —$CF_2O(CF_2CF_2O)_r(CF_2O)_sCF_2$—, —$CF_2O(CF_2CF_2O)_s CF_2$—, and r, s are independently from 1 to

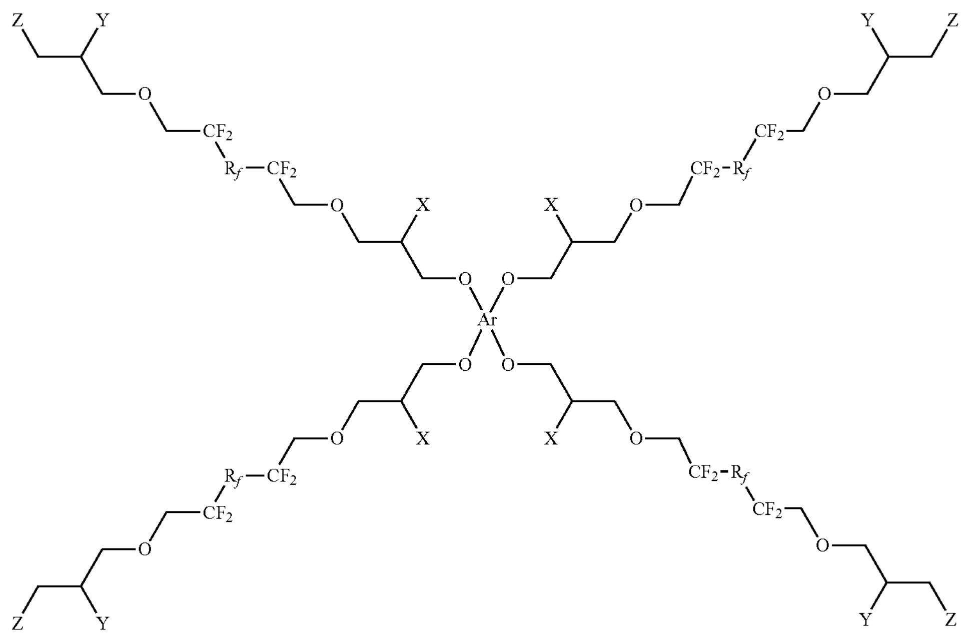

where Ar is a polyaromatic hydrocarbon (PAH) ring system, X, Y and Z can independently be hydroxyl, a phosphonic acid moiety, a silanol or a carboxylic acid moiety, and where $R_f$ may be $CF_2O(CF_2CF_2)nCF_2$— where n is from 1 to 100 or $R_f$ may be —$CF_2CF_2O(CF_2CF_2CF_2CF_2O)_sCF_2CF_2$—, —$CF_2CF_2O(CF_2CF_2CF_2O)_sCF_2CF_2$—, —$CF_2CF_2O[CF(CF_3)CF_2O]_sCF_2CF_2$—, —$CF_2O(CF_2CF_2O)_r(CF_2O)_sCF_2$—, —$CF_2O(CF_2CF_2O)_sCF_2$—, and r, s are independently from 1 to 100, and wherein the first polar group may be at least one selected from hydroxyl, phosphonic acid, silanol or carboxylic acid. In the disclosure, p may be from 1 to 10.

Other aspects and advantages of the disclosure will become apparent from the following detailed description, which, when taken in conjunction with the drawings, illustrate by way of example, the principles of the invention.

DETAILED DESCRIPTION

Figure 1A:
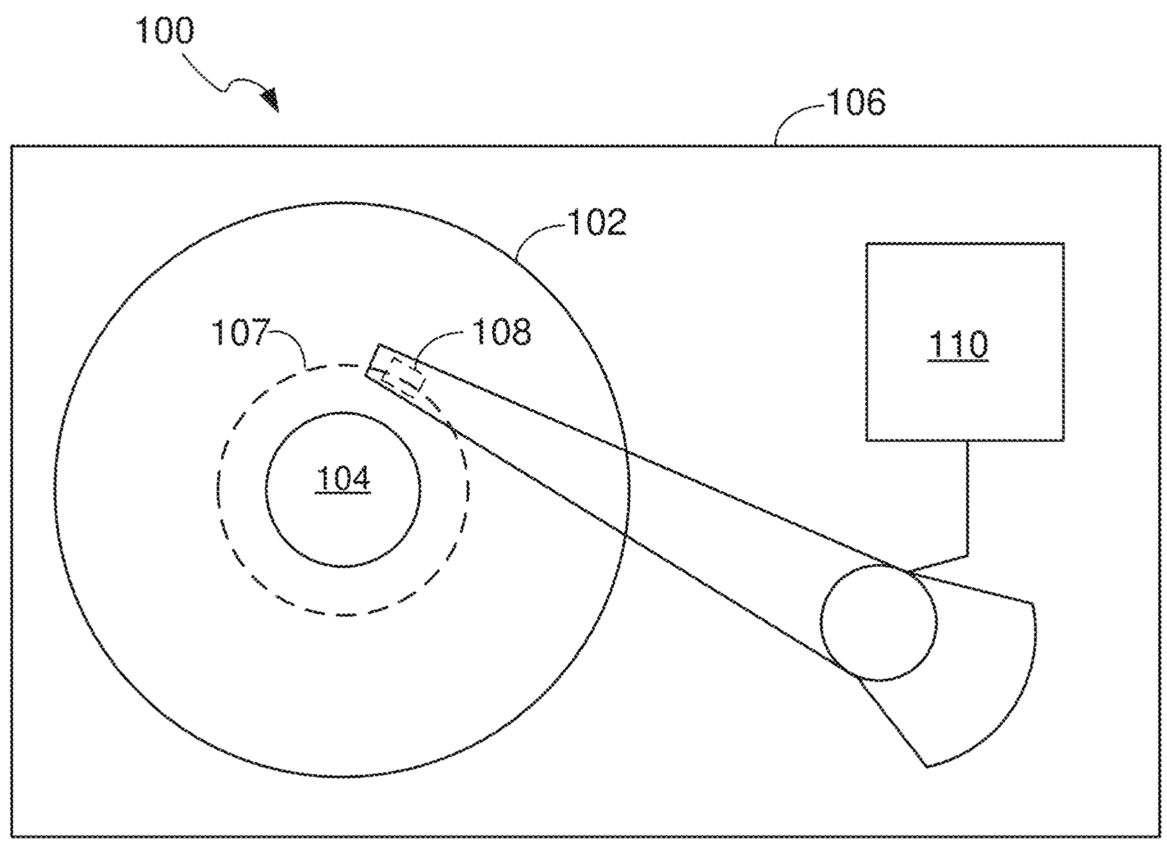
FIG. 1*a* is a diagram schematically illustrating a data storage device including a slider and a magnetic recording medium in accordance with one aspect of the disclosure.

Heat Assisted Magnetic Recording (HAMR) systems operate at substantially higher temperatures than traditional magnetic recording systems, also referred to herein as conventional magnetic recording (CMR) systems which do not employ heat or other energy assisted recording. Examples of CMR systems may include perpendicular magnetic recording disk drives and flexible tape media usable for magnetic tape recording, which do not employ heat or other energy assisted recording. HAMR is an example of magnetic recording within the class of Energy Assisted Magnetic Recording (EAMR) techniques, where CMR is supplemented by other energy used in the system. Other examples of EAMR may include Microwave Assisted Magnetic Recording (MAMR) and applications of electric current into various conductive and/or magnetic structures near the main pole.

The thickness of a lubricant on the outer overcoat of magnetic recording media, a non-limiting example of which is a disk of a HDD, is less than 10 nm. The lubricant plays a number of roles at the head-disk interface, including spacing/clearance establishment, chemical integration, contamination prevention, head wear reduction, head-disk interaction control etc., Ideally, the lubricant film stays on the disk and not migrate into the environment of the HDD. If it does migrate, the mechanical and chemical integrations of head and disks are changed and thereby performance is impacted. Loss of the protections of a lubricant film caused by evaporation, depletion/migration, degradation, and/or oxidation of the molecules can even result in head crash and ultimately the HDD to fail. When the organofluorine hydrocarbon backbone chains, and/or certain functional groups of a lubricant molecule are degraded, decomposed, oxidized, depleted, and/or evaporated, resulting in an increased likelihood of the loss of functionality and performance of the lubricant film safeguarding the disk if surface adsorption of the molecules is not greatly stabilized at elevated temperatures, especially in an oxidative environment.

This problem is addressed by incorporating moieties of aromatic groups, PAH, annulenes, cycloalkanes, and heterocycles into the structure of the lubricant to yield a more thermally robust lubricant molecule that is resistant to failure at temperatures outside of the preferred operating range, as well as unexpectedly extending the lifespan of the magnetic recording medium.

More specifically, the lubricant may be designated by the formula:

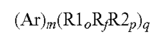

$$(Ar)_m(R1_oR_fR2_p)_q$$

where

Ar is an aromatic group, a polyaromatic hydrocarbon (PAH), an annulene, a cycloalkane, or a heterocycle, etc., m is from 1 to 10, R1 is a moiety containing a first polar group and optionally an aromatic group or a PAH, R2 is a moiety containing a second polar group and optionally an aromatic group or a PAH, $R_f$ is a perfluorinated polyether, is from 1 to 10 p is from 0 to 10 or 1 to 10, and q is from 1 to 10.

The first polar group may be hydroxyl, phosphonic acid, silanol or carboxylic acid, and the second polar group may be hydroxyl, phosphonic acid, silanol or carboxylic acid. $R_f$ may be $—CF_2CF_2O(CF_2CF_2CF_2CF_2O)_sCF_2CF_2—$, $CF_2CF_2O(CF_2CF_2CF_2O)_sCF_2CF_2$, $—CF_2CF_2O[CF(CF_3)CF_2O]_sCF_2CF_2—$, $—CF_2O(CF_2CF_2O)_r(CF_2O)_sCF_2—$, $—CF_2O(CF_2CF_2O)_sCF_2—$, and r, s are independently from 1 to 100. Alternately, $R_f$ may be $—CF_2O(CF_2CF_2O)_qCF_2—$, and q is from 1 to 100. The PAH may be, but is not restricted to, pyrene, naphthalene, phenalene, phenanthrene or triphenylene.

Definitions

For purposes herein, and the claims thereto, the new numbering scheme for the Periodic Table Groups is used as described in Chemical and Engineering News, 63(5), pg. 27 (1985). Therefore, a "group 4 metal" is an element from group 4 of the Periodic Table, e.g. Hf, Ti, or Zr. For purposes herein, molecular weight refers to number average molecular weight (Mn) and is expressed as grams per mole (g/mol) unless otherwise specified.

As used herein, and unless otherwise specified, the term "$C_n$" means hydrocarbon(s) or perfluorocarbons(s) having n carbon atom(s) per molecule, where n is a positive integer. Likewise, a "$C_m$-$C_y$" group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1, 2, 3 and 4.

The term "moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group containing of hydrogen and carbon atoms only. Preferred hydrocarbyls are $C_1$-$C_{20}$ radicals that may be linear, branched, star, comb, dendritic or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a heteroatom is any non-carbon atom, selected from groups 13 through 17 of the periodic table of the elements. In one or more aspects, heteroatoms are non-metallic atoms selected from B, N, O, Si, P, S, As Se, Te and the halogens F, Cl, Br, I, and At.

Unless otherwise indicated, the term "substituted" means that at least one hydrogen atom has been replaced with at least one non-hydrogen atom or a functional group.

For purposes herein, a functional group includes one or more of $Si(OH)_3$, $PO(OH)_2$, COOH, a hydrocarbyl group, a heteroatom, or a heteroatom containing group, such as halogen (such as Br, Cl, F or I) or at least one functional group such as $—NR^*_2$, —NR*—CO—R*, —OR*,*—O—CO—R*, —CO—O—R*, —SeR*, —TeR*, $—PR^*_2$, $—PO—(OR^*)_2$, $—O—PO—(OR^*)_2$, $—AsR^*_2$, $—SbR^*_2$, —SR*, $—SO_2—(OR^*)_2$, $—BR^*_2$, $—SiR^*_3$, $—(CH_2)_q—SiR^*_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

In one or more aspects, functional groups may include: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_3$-$C_{20}$ radical, a cyclotriphosphazine radical, a halogen, $—NR^*_2$, —NR*—CO—R*, —OR*, —O—CO—R*, —CO—O—R*, —SeR*, —TeR*, $—PR^*_2$, $—PO—(OR^*)_2$, $—O—PO—(OR^*)_2$, $—N{=}P(NR^*_2)_3$, $—AsR^*_2$, —SR*, $—SO_2—(OR^*)_2$, $—BR^*_2$, $—SiR^*_3$, $—(CH_2)_q—SiR^*_3$, $—(CF_2)_q—SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical.

For purposes herein, a functional group, which is attachable to a surface of a magnetic recording medium, refers to functional groups having entirely changed affinity for that surface relative to the affinity of perfluoroalkyl ethers to that same surface. The completely different affinity may include chemical bonding and chemisorption beyond conventional physical bonding, like a hydrogen bond, Van der Waals forces, weak London Dispersion forces, dipole-dipole interaction, and/or the like, and/or one or more types of bonds and/or dative bonds with the surface of the magnetic recording media, preferably with a protective overcoat of a recording media. In one or more aspects, a functional group which is attachable to a surface of a magnetic recording medium refers to functional groups having enabled affinity in a chemical way for the carbon overcoat (COC) layer of the magnetic recording media, relative to the affinity of perfluoroalkyl ethers to that same surface.

A heterocyclic ring also referred to herein as a heterocyclic radical, is a ring having a heteroatom in the ring structure as opposed to a heteroatom substituted ring where hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where hydrogen of one of the ring atoms is substituted, e.g., replaced with a hydrocarbyl, or a heteroatom containing group.

The polyaromatic hydrocarbons (PAH) of the disclosure include naphthalene, phenalene, phenanthrene, pyrene and triphenylene. However, there is a wide range of PAH that may be used in the disclosure, as is tabulated in Table 1.

TABLE 1

Polyaromatic Hydrocarbons, Their Formulas and Their Chemical Abstracts Service (CAS) Numbers.

| Name | Molecular Formula | CAS No. |
|---|---|---|
| Acenaphthylene | $C_{12}H_8$ | 208-96-8 |
| Acephenanthrylene | $C_{16}H_{10}$ | 201-06-9 |
| Acridine | $C_{13}H_9N$ | 260-94-6 |
| Anthanthrene | see Dibenzo[def,mno]chrysene | |
| Anthracene | $C_{14}H_{10}$ | 120-12-7 |
| 9,10-Anthracenedione | $C_{14}H_8O_2$ | 84-65-1 |
| 9(10H)-Anthracenone | $C_{14}H_{10}O$ | 90-44-8 |
| Anthraquinone | see 9,10-Anthracenedione | |
| Anthrone | see 9(10H)-Anthracenone | |
| Benz[e]acephenanthrylene | $C_{20}H_{12}$ | 205-99-2 |
| Benz[c]acridine | $C_{17}H_{11}$ | 225-51-4 |
| Benz[a]anthracene | $C_{18}H_{12}$ | 56-55-3 |
| 7H-Benz[de]anthracen-7-one | $C_{17}H_{10}O$ | 82-05-3 |
| Benzanthrone | see 7H-Benz[de]anthracen-7-one | |
| Benzo[b]chrysene | $C_{22}H_{14}$ | 214-17-5 |
| Benzo[c]chrysene | $C_{22}H_{14}$ | 194-69-4 |
| Benzo[g]chrysene | $C_{22}H_{14}$ | 196-78-1 |
| Benzo[c]cinnoline | $C_{12}H_8N_2$ | 230-17-1 |
| Benzo[a]dibenzothiophene | see Benzo[b]naphtho[2,1-d]-thiophene | |
| Benzo[b]fluoranthene | see Benz[e]acephenanthrylene | |
| Benzo[ghi]fluoranthene | $C_{18}H_{10}$ | 203-12-3 |
| Benzo[j]fluoranthene | $C_{20}H_{12}$ | 205-82-3 |
| Benzo[k]fluoranthene | $C_{20}H_{12}$ | 207-08-9 |
| 11H-Benzo[a]fluorene | $C_{17}H_{12}$ | 238-84-6 |
| 11H-Benzo[b]fluorene | $C_{17}H_{12}$ | 243-17-4 |
| 7H-Benzo[c]fluorene | $C_{17}H_{12}$ | 205-12-9 |
| Benzo[h]naphtho [1,2-f]quinolene | $C_{21}H_{13}$ | 196-79-2 |
| Benzo[b]naphtho[2,1-d]thiophene | $C_{16}H_{10}$ | 239-35-0 |
| Benzo[rst]pentaphene | $C_{24}H_{14}$ | 189-55-9 |
| Benzo[ghi]perylene | $C_{22}H_{12}$ | 191-24-2 |
| Benzo[c]phenanthrene | $C_{18}H_{12}$ | 195-19-7 |
| Benzo[a]pyrene | $C_{20}H_{12}$ | 50-32-8 |
| Benzo[e]pyrene | $C_{20}H_{12}$ | 192-97-2 |
| Benzo[f]quinoline | $C_{13}H_9$ | 85-02-9 |
| Benzo[h]quinoline | $C_{13}H_9$ | 230-27-3 |
| Benzo[b]triphenylene | $C_{22}H_{14}$ | 215-58-7 |
| Biphenylene | $C_{12}H_8$ | 259-79-0 |
| 9H-Carbazole | $C_{12}H_9$ | 86-74-8 |
| Chrysene | $C_{18}H_{12}$ | 218-01-9 |
| Coronene | $C_{24}H_{12}$ | 191-07-1 |
| 4H-Cyclopenta[def]phenanthrene | $C_{15}H_{10}$ | 203-64-5 |
| Cyclopenta[cd]pyrene | $C_{18}H_{10}$ | 27208-37-3 |
| Dibenz[a,h]acridine | $C_{21}H_{13}$ | 226-36-8 |
| Dibenz[a,j]acridine | $C_{21}H_{13}$ | 224-42-0 |
| Dibenz[c,h]acridine | $C_{21}H_{13}$ | 224-53-3 |
| Dibenz[a,c]anthracene | see Benzo[b]triphenylene | |
| Dibenz[a,h]anthracene | $C_{22}H_{14}$ | 53-07-3 |
| Dibenz[a,j]anthracene | $C_{22}H_{14}$ | 224-41-9 |
| 7H-Dibenzo[a,g]carbazole | $C_{20}H_{13}$ | 207-84-1 |
| 13H-Dibenzo[a,i]carbazole | $C_{20}H_{13}$ | 239-64-5 |
| 7H-Dibenzo[c,g]carbazole | $C_{20}H_{13}$ | 194-59-2 |
| Dibenzo[b,def]chrysene | $C_{24}H_{14}$ | 189-64-0 |
| Dibenzo[def,mno]chrysene | $C_{22}H_{12}$ | 191-26-4 |
| Dibenzo[def,p]chrysene | $C_{24}H_{14}$ | 191-30-0 |
| Dibenzo[b,h]phenanthrene | see Pentaphene | |
| Dibenzo[a,e]pyrene | see Naphtho[1,2,3,4-def]chrysene | |
| Dibenzo[a,h]pyrene | see Dibenzo[b,def]chrysene | |

TABLE 1-continued

| Polyaromatic Hydrocarbons, Their Formulas and Their Chemical Abstracts Service (CAS) Numbers. | | |
|---|---|---|
| Name | Molecular Formula | CAS No. |
| Dibenzo[a,i]pyrene | see Benzo[rst]pentaphene | |
| Dibenzo[a,1]pyrene | see Dibenzo[def,p]chrysene | |
| Dibenzothiophene | $C_{12}H_8S$ | 132-65-0 |
| Fluoranthene | $C_{16}H_{10}$ | 206-44-0 |
| 9H-Fluorene | $C_{13}H_{10}$ | 86-73-7 |
| 9H-Fluoren-9-one | $C_{13}H_8O$ | 484-25-9 |
| Indeno[1,2,3-cd]pyrene | $C_{22}H_{12}$ | 193-39-5 |
| 1H-Indole | $C_8H_7N$ | 120-72-9 |
| Isoquinoline | $C_9H_7N$ | 119-65-3 |
| Naphthacene | $C_{18}H_{12}$ | 92-24-0 |
| Naphthalene | $C_{10}H_8$ | 91-20-3 |
| Naphtho[1,2,3,4-def] chrysene | $C_{24}H_{14}$ | 192-65-4 |
| Naphtho[2,3-f]quinoline | $C_{17}H_{11}$ | 224-98-6 |
| Pentaphene | $C_{22}H_{14}$ | 222-93-5 |
| Perylene | $C_{20}H_{12}$ | 198-55-0 |
| 1H-Phenalene | $C_{13}H_{10}$ | 203-80-5 |
| Phenanthraquinone | see 9,10-Phenanthrenedione | |
| Phenanthrene | $C_{14}H_{10}$ | 85-01-8 |
| 9,10-Phenanthrenedione | $C_{14}H_8O_2$ | 84-11-7 |
| Phenanthridine | $C_{13}H_9N$ | 229-87-8 |
| 1,10-Phenanthroline | $C_{12}H_8N_2$ | 66-71-7 |
| Phenanthro[4,5-bcd]thiophene | $C_{14}H_8S$ | 30796-92-0 |
| Phenazine | $C_{12}H_8N_2$ | 92-82-0 |
| Phenazone | see Benzo[c]cinnoline | |
| Picene | $C_{22}H_{14}$ | 213-46-7 |
| Pyrene | $C_{16}H_{10}$ | 129-00-0 |
| Quinoline | $C_9H_7N$ | 91-22-5 |
| Triphenylene | $C_{18}H_{12}$ | 217-59-4 |
| 9H-Xanthene | $C_{13}H_{10}O$ | 92-83-1 |

A "compound" refers to a substance that is composed of two or more separate chemical elements. A "derivative" refers to a compound in which one or more of the atoms or functional groups of a precursor compound have been replaced by another atom or functional group, generally by means of a chemical reaction having one or more steps.

For purposes herein, unless otherwise specified, the media lubricants include a plurality of segments and each segment is attached to the other segment by an ether bond, e.g., a —C—O—C-linkage. For purposes herein, a segment including a perfluoropolyalkyl ether moiety may have the general formula:

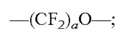

$$—(CF_2)_aO—;$$

wherein each a is from 1 to 100. A segment including a perfluoroalkyl ether moiety has the general formula:

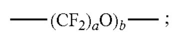

$$—(CF_2)_aO)_b—;$$

wherein each a is from 1 to 100 and b is the number of repeating units in the segment.

The perfluoroalkyl ether moieties present in a particular segment are bonded together to form a perfluoropolyalkyl ether chain. Unless indicated otherwise, each of the perfluoroalkyl ether moieties present in a perfluoropolyalkyl ether segment may be the same or different. For example, the following are each examples of a perfluoropolyalkyl ether segments:

i) $—(CF_2CF_2O)_b—$, a perfluoropolyethylether segment;

ii) $—(CF_2CF_2CF_2O)_b—$, a perfluoropolypropylether segment;

iii) $—(CF(CF_3)CF_2O)_b—$, a perfluoropolybutylether segment;

iv) $—(CF_2CF_2CF_2CF_2O)_b—$, a perfluoropolybutylether segment; and v) $—(CF_2CF_2O)_b—(CF_2O)_b—$, a perfluoropolyethylether-perfluoropolymethylether segment, also referred to in the art as a Z-chain segment.

For purposes herein, the molecular weight of a segment, e.g., a divalent center segment including a perfluoroalkyl ether moiety Re and/or a divalent sidechain segment including a perfluoroalkyl ether moiety $Rb^1$ and $Rb^2$ is defined as the molecular weight of the perfluoroalkyl ether moieties present in the segment.

Unless otherwise indicated, a divalent center segment, abbreviated Re herein, refers to a divalent chemical moiety optionally including a perfluoroalkyl ether moiety, or optionally which is formed from one or more perfluoroalkyl ether moiety, that is chemically bonded via an ether linkage to a linking segment moiety on either side.

An intermediate or linking segment, abbreviated as Ri herein, refers to a chemical moiety bonded between the center segment and a sidechain segment by an ether linkage, and which includes at least one functional group, which is preferably selected to attached to the protective layer of the magnetic recording media.

A side chain segment, abbreviated Rb herein, refers to a divalent chemical moiety including a perfluoroalkyl ether moiety, or formed from one or more perfluoroalkyl ether moieties, that is chemically bonded via an ether linkage to a linking segment moiety and an end segment.

An end segment, abbreviated Re herein, refers to a mono-valent radical which includes at least one functional group preferably selected to attached to the protective layer of the magnetic recording media. The end moieties are located at either end of a sidechain of the lubricant molecule.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, conformational isomers, spatial isomers, and/or the like.

As used herein, the term "adsorption" refers to individual molecules, atoms or ions gathering on a surface. In comparison, the term "absorption" is where a material is soaked into a bulk of another phase or material such as a sponge, cloth, filter, etc.

Data Storage Device

FIG. 1*a* is a top schematic view of a data storage device 100 (e.g., disk drive or magnetic recording device) configured for magnetic recording including a slider 108 and a magnetic recording medium 102 having a lubricant layer according to one or more aspects of the disclosure. The laser (not visible in FIG. 1*a* but see 114 in FIG. 1*b*) specifically used for heat-assisted magnetic recording (HAMR) is positioned with a head/slider 108. Disk drive 100 may include one or more disks/media 102 to store data. Disk/media 102 resides on a spindle assembly 104 that is mounted to a drive housing. Data may be stored along tracks in the magnetic recording layer of disk 102. The reading and writing of data are accomplished with the head 108 (slider) that may have both read and write elements (108*a* and 108*b*). The write element 108*a* is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller).

Figure 1B:
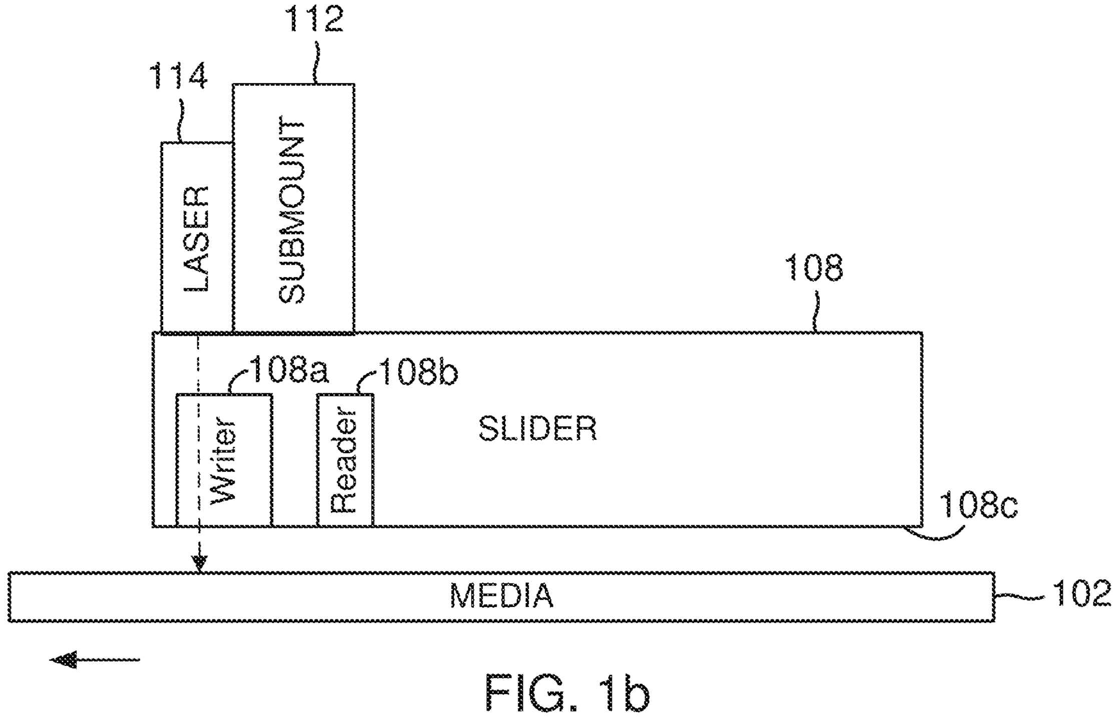
FIG. 1*b* is a side schematic view of the slider and magnetic recording medium of FIG. 1*a* in accordance with one aspect of the disclosure.

FIG. 1*b* is a side schematic view of the slider 108 and magnetic recording medium 102 of FIG. 1*a*. The magnetic recording medium 102 includes a lubricant layer (see FIG. 3) in accordance with one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108*a* and a read element (e.g., reader) 108*b* positioned along an air bearing surface (ABS) 108*c* of the slider for writing information to, and reading information from, respectively, the media 102. In other aspects, the slider may also include a layer of the lubricant (not shown).

In operation, the laser 114 used in HAMR is configured to generate and direct light energy to a waveguide (e.g., along the dashed line) in the slider which directs the light to a near field transducer (NFT) near the air bearing surface (e.g., bottom surface) 108*c* of the slider 108. Upon receiving the light from the laser 114 via the waveguide, the NFT generates localized heat energy that heats a portion of the media 102 within or near the write element 108*a*, and near the read element 108*b*. The anticipated recording temperature is in the range of about 300° C. to 500° C. In the aspect illustrated in FIG. 1*b*, the laser directed light is disposed within the writer 108*a* and near a trailing edge of the slider. In other aspects, the laser directed light may instead be positioned between the writer 108*a* and the reader 108*b*. FIG. 1*b* illustrates a specific example of a HAMR system. In other examples, the magnetic recording medium 102 with the lubricant layer according to aspects of the disclosure can be used in other suitable HAMR systems (e.g., with other sliders configured for HAMR). The medium can also be used in EAMR and MAMR systems, or in other non-HAMR systems.

Magnetic Recording Medium

Figure 2:
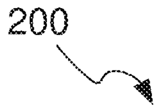
FIG. 2 is a side schematic view of a magnetic recording medium including a lubricant layer in accordance with one aspect of the disclosure.
Figure 2:
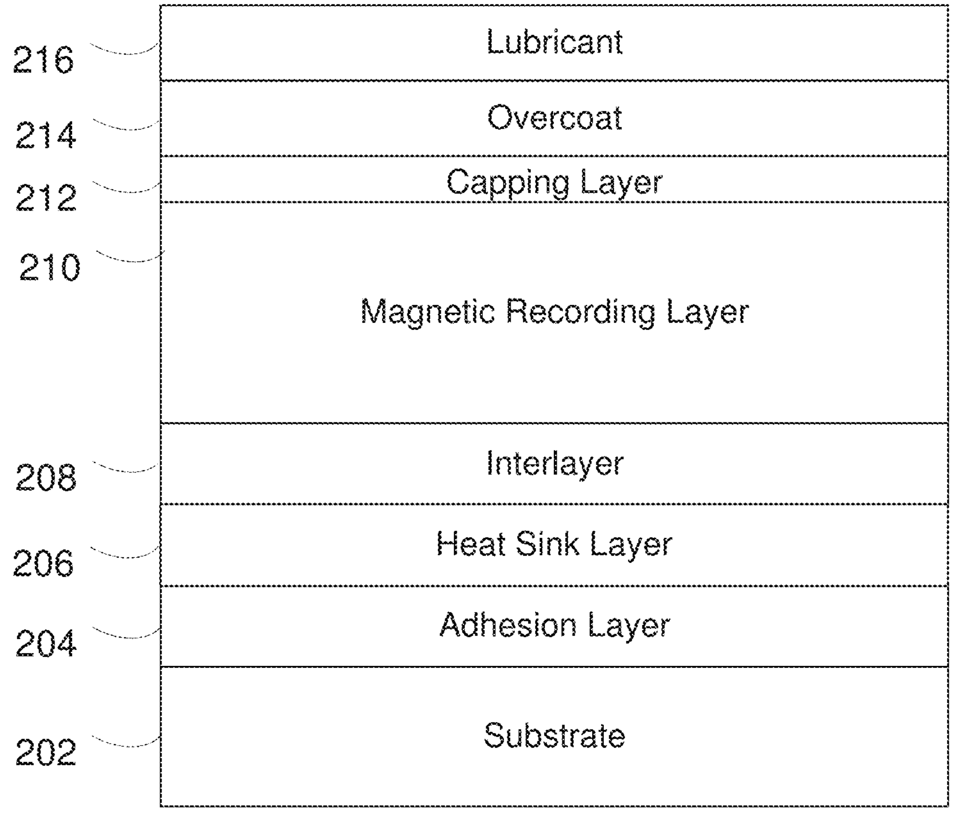

FIG. 2 is a side schematic view of a magnetic recording medium 200 configured, for example, for heat assisted magnetic recording and having a lubricant layer according to one or more aspects of the disclosure. In one aspect, the magnetic recording medium 200 may be used in a data storage system configured for HAMR, EAMER or MAMR (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a magnetic recording layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a soft magnetic underlayer (SUL) between the adhesion layer 204 and the heat sink layer 206. In one aspect, the magnetic recording medium 200 may have a thermal resistance layer (TRL) between the interlayer 208 and the heat sink layer 206. Some of the layers such as TRL and heat sink layer may be absent or substituted with different layers in non-HAMR recording medium. In one aspect, the substrate 202 can be made of one or more materials such as an Al alloy, NiP plated Al, glass, glass ceramic, and/or combinations thereof. In some aspects, the magnetic recording medium 200 may have some or all of the layers illustrated in FIG. 2 and/or additional layer(s) in various stacking orders. It should also be noted that each layer shown in FIG. 2 may include one or more sub-layers. For example, the magnetic recording layer may have multiple layers in certain embodiments.

Lubricants

In one aspect, lubricants disclosed herein may function as a lubricating molecular layer which may be used in various mechanical devices, including data storage systems configured for magnetic recording (e.g., hard disk drives, tape drives, etc.) and other microelectronic mechanical systems. The polymeric or macromolecular lubricants may form a lubricant layer when one or more functional groups of the lubricant adsorb or otherwise couple with the surface being lubricated. For instance, a lubricant layer 216 is formed on a magnetic recording medium 200 (e.g. a disk that includes a magnetic recording layer 210) that moves relative to other parts in the mechanical device. This lubricant layer 216 helps to protect the magnetic recording medium from friction, wear, contamination and/or damage caused by interactions between the magnetic recording medium and other parts in the mechanical device (e.g., interactions, such as contact, attrition, abrasion, erosion between a slider and the magnetic recording medium in a certain circumstance). In other words, this interfacial polymeric and/or molecular layer helps enable reliable, robust, and enduring chemical/mechanical integrations of the magnetic recording medium with the read/write heads.

Figure 3:
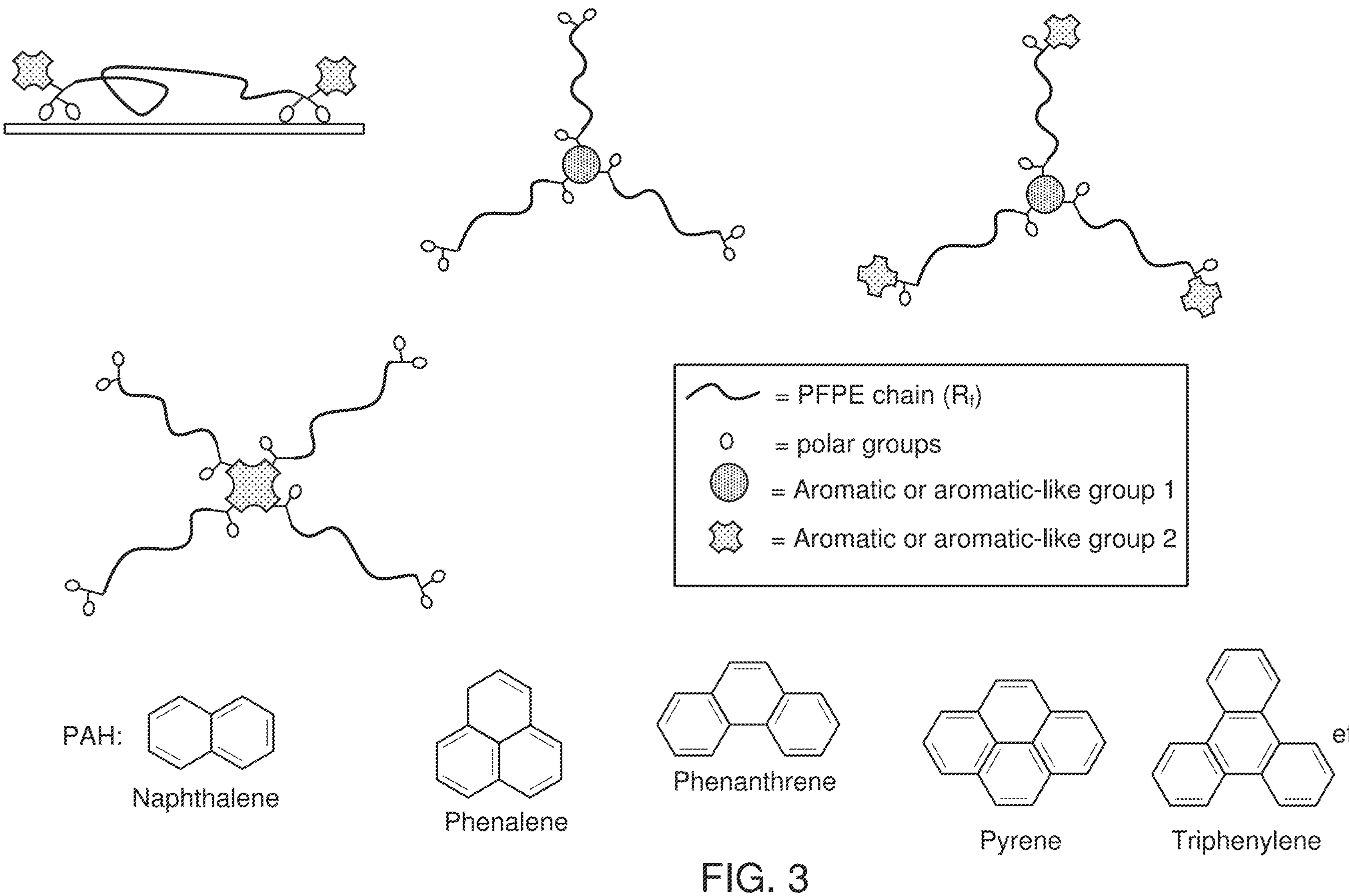
FIG. 3 shows the molecular design schematic of polyaromatic hydrocarbon (PAH) containing lubricants having improved thermal stability in accordance with one aspect of the disclosure.

FIG. 3 is a schematic that illustrates the molecular design of lubricants incorporating aromatic rings. Bonding to the recording media substrate is via polar groups that can either be located near the end of the PFPE chain or more central near the aromatic core. The aromatic can be selected from an aromatic ring or from different PAH cores. A non-inclusive list of the PAH rings include the following:

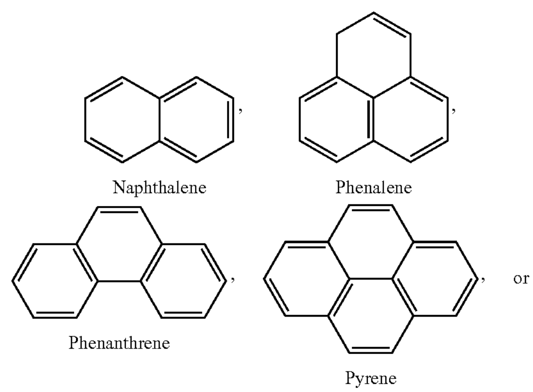

Naphthalene, Phenalene, Phenanthrene, Pyrene, or

-continued

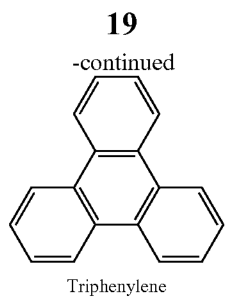

Triphenylene

The disclosure is not limited to these PAH rings but can include any suitable PAH ring, such as is set forth in Table 1.

The general structure of the PAH containing lubricant of the disclosure may be set forth in the following formula:

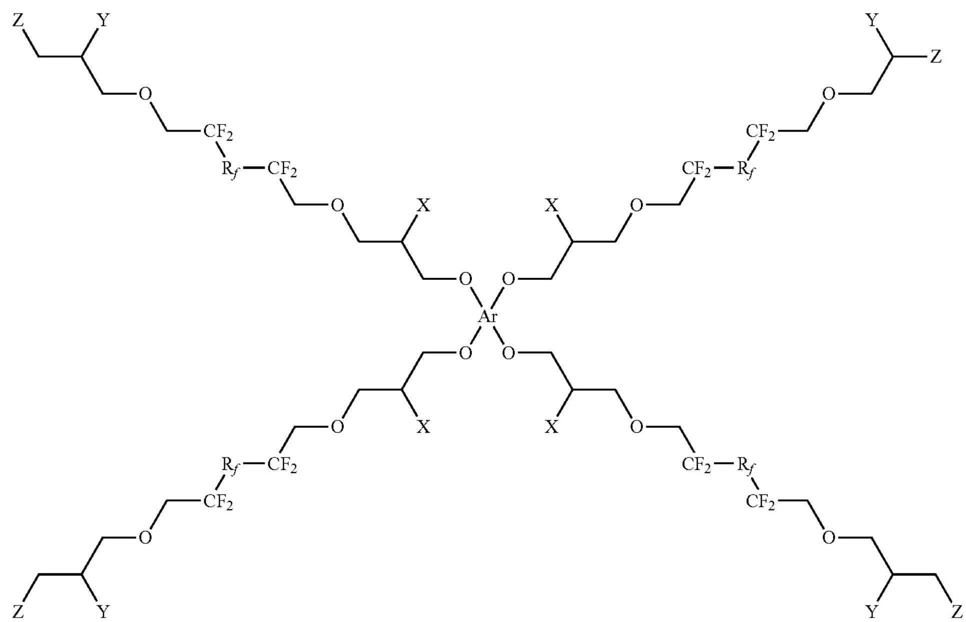

where Ar is a polycyclic aromatic hydrocarbon (PAH) ring system, X, Y and Z can independently be hydroxyl, a phosphoric acid moiety, a silanol or a carboxylic acid moiety, and where $R_f$ may be $CF_2O(CF_2CF_2)_nCF_2$— where n is 1 to 100. $R_f$ may also be —$CF_2CF_2O(CF_2CF_2CF_2CF_2O)_s$ $CF_2CF_2$—, —$CF_2CF_2O(CF_2CF_2CF_2O)_sCF_2CF_2$—, —$CF_2CF_2O[CF(CF_3)CF_2O]_s$ $CF_2CF_2$—, —$CF_2O(CF_2CF_2O)_r(CF_2O)_sCF_2$—, —$CF_2O(CF_2CF_2O)_sCF_2$—, and r, s are independently from 1 to 100. The aromatic PAH center can be naphthalene, phenalene, phenanthrene, triphenylene or any of the aromatic materials set forth in Table 1.

In one aspect, the lubricant may have the formula:
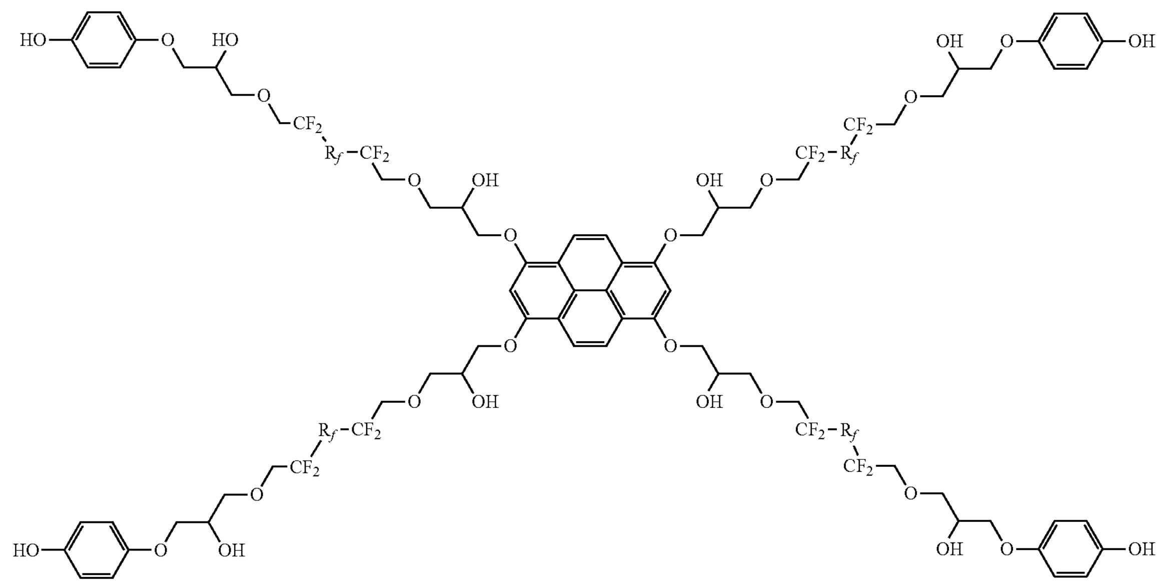
where $R_f$ may be $CF_2O(CF_2CF_2)_nCF_2$— where n is 1 to 100, or $R_f$ may be $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)—CF_2O]_sCF_2CF_2—$, $—CF_2O(CF_2CF_2O)_r(CF_2O)_sCF_2—$, $—CF_2O(CF_2CF_2O)_sCF_2—$, and r, s are independently from 1 to 100.
In one aspect, the lubricant may have the formula:
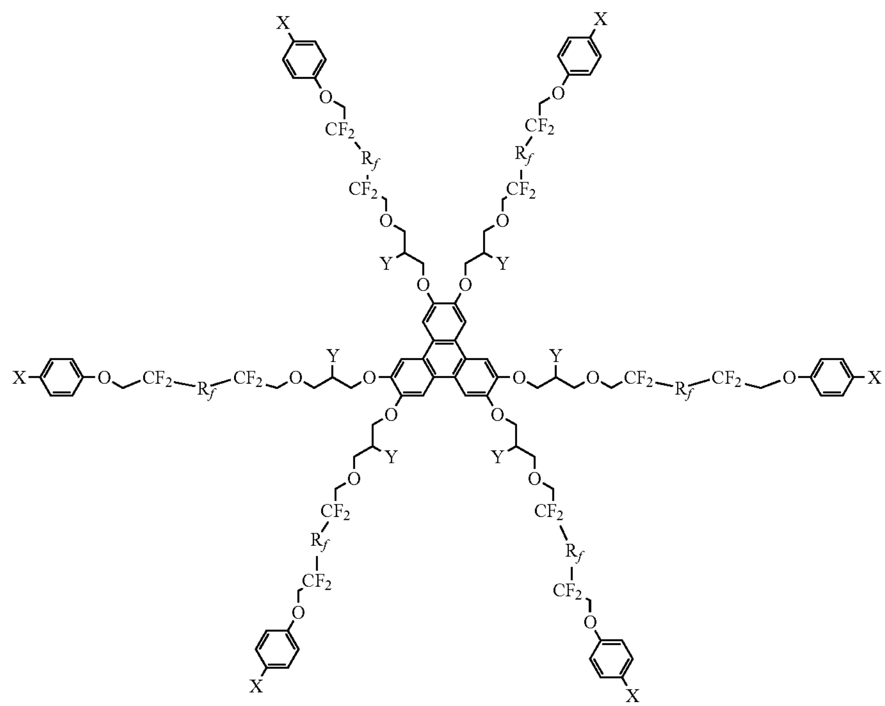

where X and Y are independently be hydroxyl, a phosphoric acid moiety, a silanol or a carboxylic acid moiety, and where $R_f$ is $CF_2O(CF_2CF_2)_nCF_2$— where n is from 1 to 100, or $R_f$ may also be —$CF_2CF_2O(CF_2CF_2CF_2CF_2O)_sCF_2CF_2$—, —$CF_2CF_2O(CF_2CF_2CF_2O)_sCF_2CF_2$—, —$CF_2CF_2O[CF(CF_3)CF_2O]_sCF_2CF_2$—, —$CF_2O(CF_2CF_2O)_r(CF_2O)_sCF_2$—, —$CF_2O(CF_2CF_2O)_sCF_2$—, and r, s are independently from 1 to 100. The aromatic center is not restricted to pyrene, but can also be naphthalene, phenalene, phenanthrene, triphenylene or any of the aromatic materials set forth in Table 1.

In one aspect, the lubricant may also be designated by the formula:

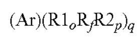

$$(Ar)(R1_oR_fR2_p)_q$$

where

Ar is an aromatic group, a polyaromatic hydrocarbon (PAH), an annulene, a cycloalkane, or a heterocycle, etc., m is from 1 to 10

R1 is a moiety containing a first polar group,

R2 is a moiety containing a second polar group, $R_f$ is a perfluorinated polyether, is from 1 to 10 p is from 0 to 10 or 1 to 10, and q is from 1 to 10.

The first polar group may be hydroxyl, phosphonic acid, silanol or carboxylic acid, and the second polar group may be hydroxyl, phosphonic acid, silanol or carboxylic acid. $R_f$ may be —$CF_2CF_2O(CF_2CF_2CF_2CF_2O)_sCF_2CF_2$—, —$CF_2CF_2O(CF_2CF_2CF_2O)_sCF_2CF_2$—, —$CF_2CF_2O[CF(CF_3)$ —$CF_2O]_sCF_2CF_2$—, —$CF_2O(CF_2CF_2O)_r(CF_2O)_sCF_2$—, —$CF_2O(CF_2CF_2O)_sCF_2$—, and r, s are independently from 1 to 100. Alternately, $R_f$ may be —$CF_2O(CF_2CF_2O)_qCF_2$—, and q is from 1 to 100.

The X, Y and Z constituents, all of which include —OH groups capable of bonding with the magnetic recording media, may be non-exclusively selected from the following:

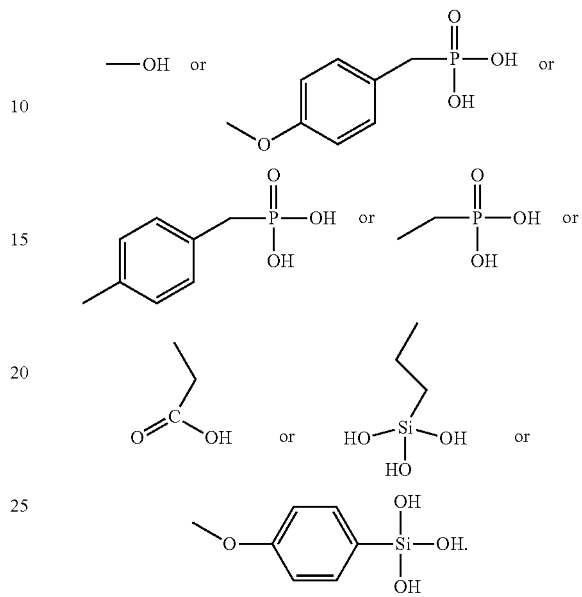

In an embodiment, the lubricant can have the formula:

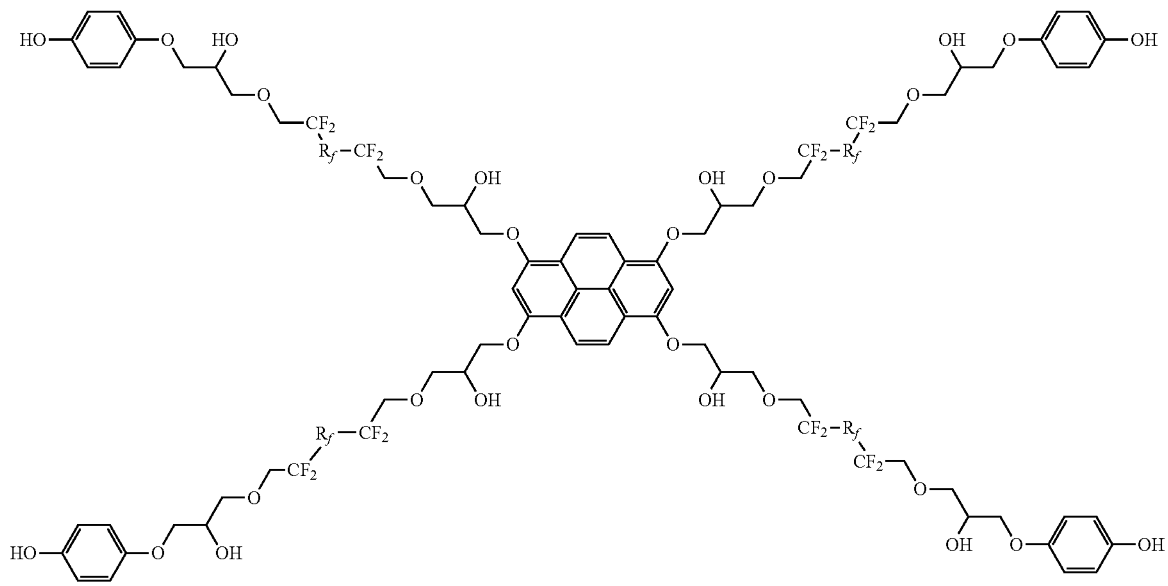

where $R_f$ may be $CF_2O(CF_2CF_2)_nCF_2$— where n is from 1 to 100, or $R_f$ may —$CF_2CF_2O(CF_2CF_2CF_2CF_2O)_sCF_2CF_2$—, —$CF_2CF_2O(CF_2CF_2CF_2O)_sCF_2CF_2$—, —$CF_2CF_2O[CF(CF_3)CF_2O]_sCF_2CF_2$—, —$CF_2O(CF_2CF_2O)_r(CF_2O)_sCF_2$—, —$CF_2O(CF_2CF_2O)_sCF_2$—, and r, s are independently from 1 to 100.

In an embodiment, the lubricant can have the formula:

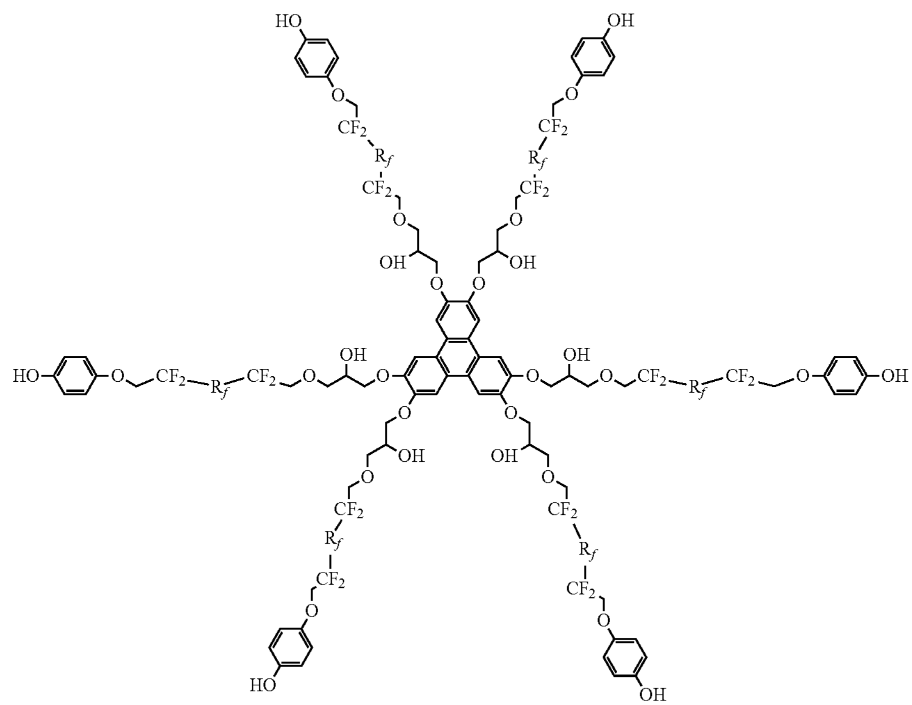

where $R_f$ may be $CF_2O(CF_2CF_2)_nCF_2$— where n is 1 to 100, or $R_f$ may be —$CF_2CF_2O(CF_2CF_2CF_2CF_2O)_sCF_2CF_2$—, —$CF_2CF_2O(CF_2CF_2CF_2O)_sCF_2CF_2$—, —$CF_2CF_2O[CF(CF_3)CF_2O]_sCF_2CF_2$—, —$CF_2O(CF_2CF_2O)_r(CF_2O)_sCF_2$—, —$CF_2O(CF_2CF_2O)_sCF_2$—, and r, s are independently from 1 to 100.

Aromaticity and Stability

Figure 4:
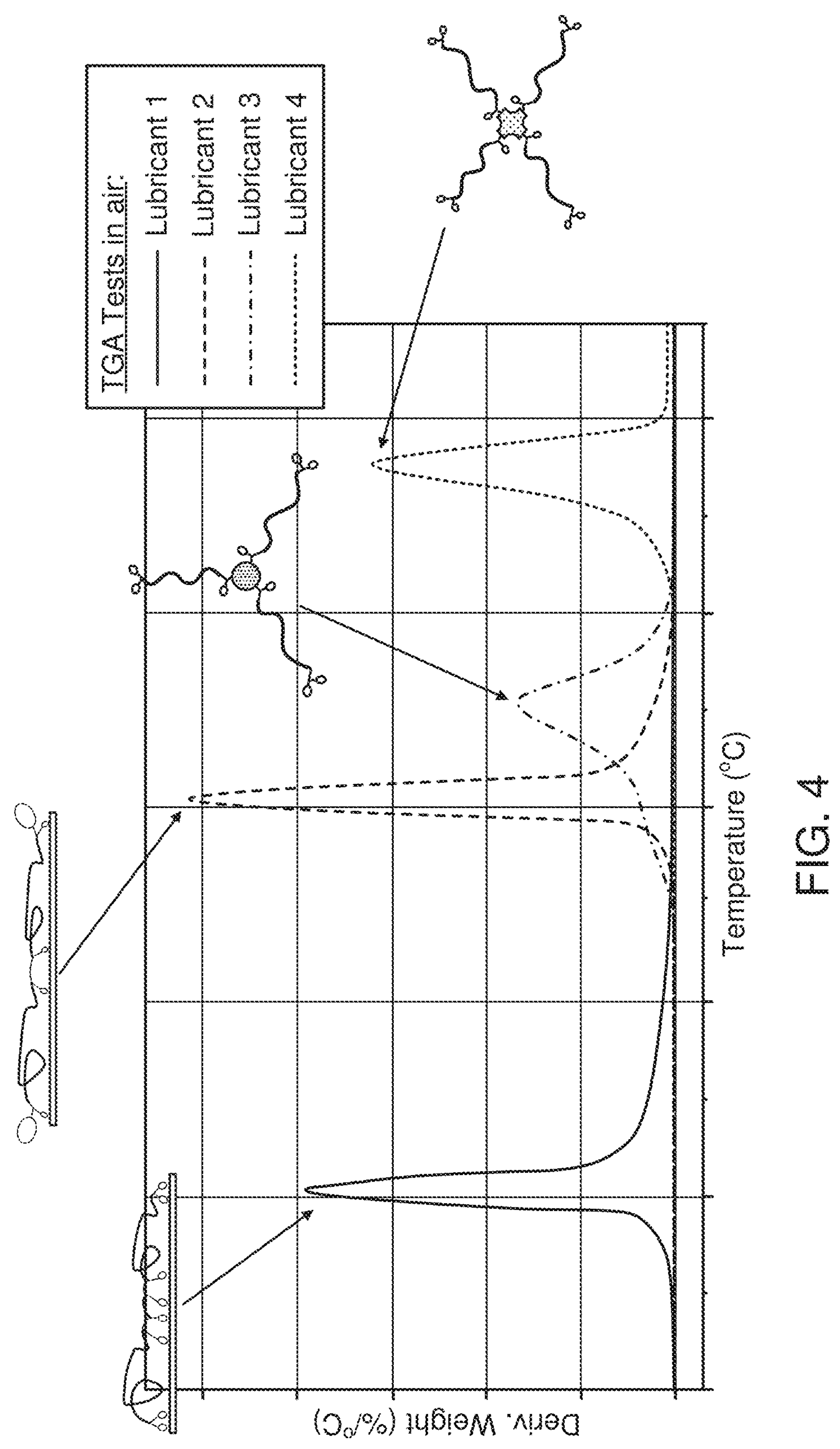
FIG. 4 is a graph showing thermogravimetric analysis (TGA) results, which indicates the improved thermal stability/oxidation resistance as weight loss derivation as a function of temperature for aromatic or aromatic-like core-terminated/centered lubricant molecules in accordance with one aspect of the disclosure.
Figure 5:
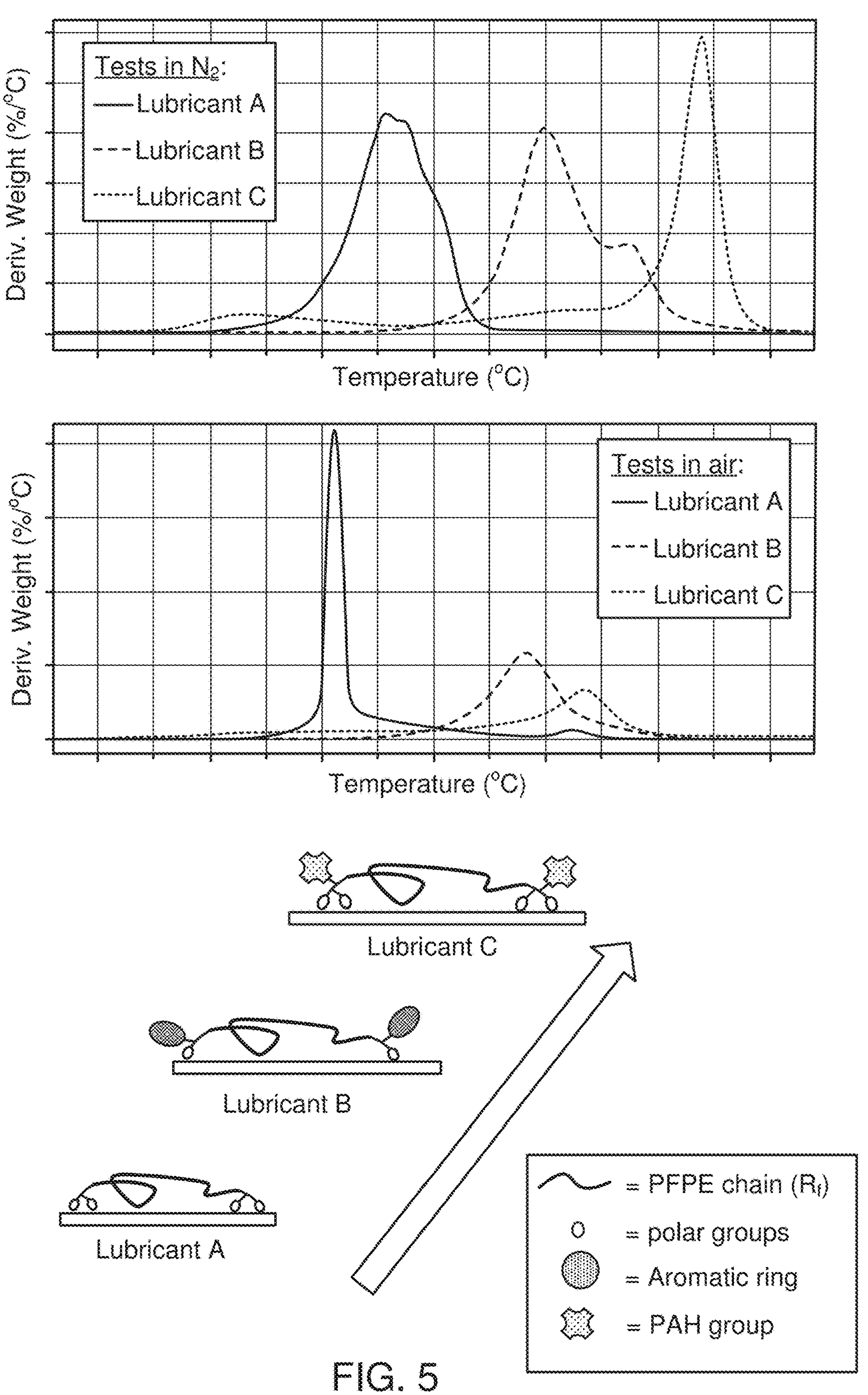
FIG. 5 are TGA results, showing the thermal stability/oxidation resistance improvement by introducing aromatic rings and by replacing aromatic rings with PAH groups in accordance with one aspect of the disclosure.
Figure 7:
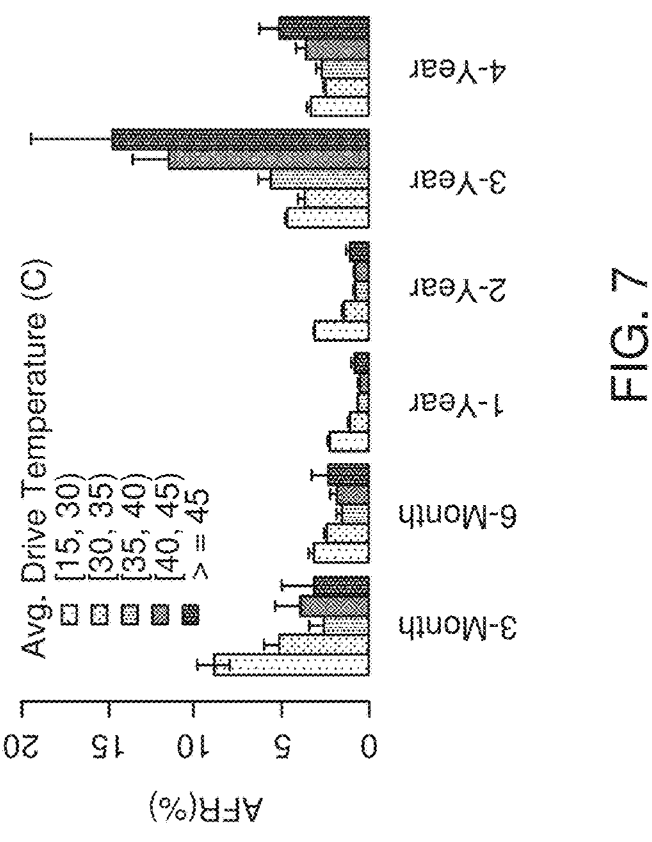
FIG. 7 shows the annual failure rate (AFR) based on both age and temperature.
Figure 6:
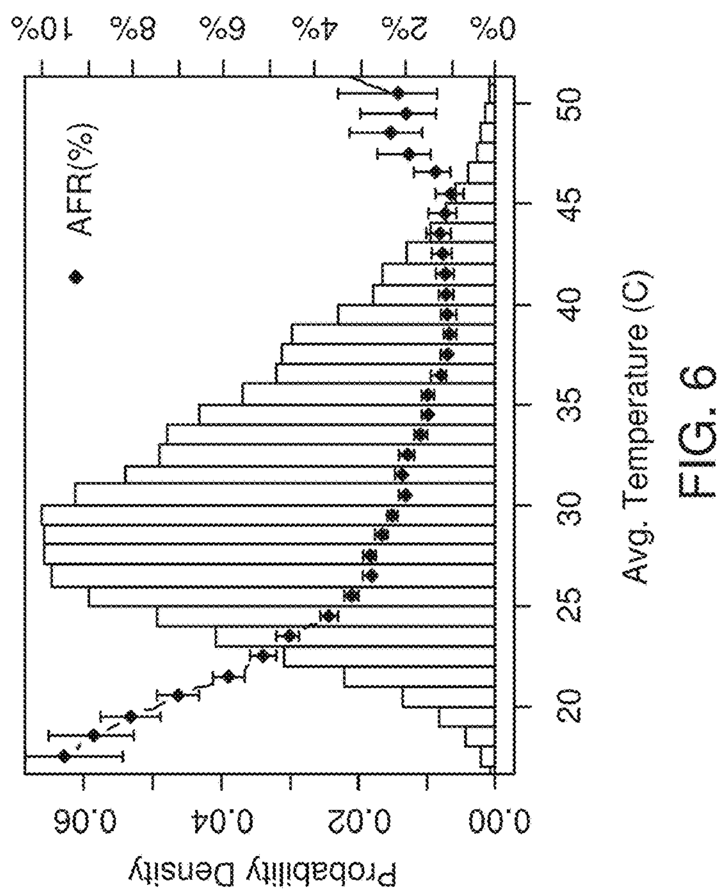
FIG. 6 shows the distribution of average temperatures and annual failure rate (AFR)

The degree of aromaticity in the lubricant has been found to have a profound effect on the thermal stability. FIGS. 4-5 illustrate an exemplary embodiment of weight-loss derivative as a function of temperature in TGA tests for aromatic or aromatic-like group-terminated/centered lubricant molecules. As shown in FIG. 4, the lubricants evaluated include Lubricant 1 (no aromatic moieties with polar middle and end groups), Lubricant 2 (aromatic moieties at the ends with polar middle and end groups, Lubricant 3 (aromatic center with polar groups at the center and at the ends of the 3 perfluoroalkyl ether chains) and Lubricant 4 (PAH center with polar groups near the center and at the ends at the 4 perfluoroalkyl ether chains). The aromatic nature of the four lubricants are as follows:

Lubricant 1<Lubricant 2<Lubricant 3<Lubricant 4.

That is, Lubricant 1 is the least aromatic and Lubricant 4 is the most aromatic. As can be seen, the degradation/oxidation regime indicated by the peak derivative of weight loss during the TGA tests occurs at higher temperatures as the degree of aromaticity increases. Also, the severity of the derivation, i.e., decomposition, tends to decrease as the aromaticity increases.

The trend of increased thermal stability/oxidation resistance with increased aromaticity is further elucidated in FIG. 5. In FIG. 5, Lubricant A has no aromaticity and is formed from a perfluoroalkyl ether chain terminated at the ends with polar constituents. Lubricant B is a perfluoroalkyl ether chain that terminates in both an aromatic constituent and a polar constituent. Lubricant C, with the most aromatic character, is a perfluoroalkyl ether chain that terminates in both a PAH constituent and polar constituents. The comparative aromaticity is as follows:

Lubricant A<Lubricant B

Lubricant B<Lubricant C.

That is, Lubricant A has the least aromatic character while Lubricant C has the most aromatic character.

In FIG. 5, the results are clear for weight-loss derivation as a function of temperature for TGA tests in both $N_2$ and air. The onset of significant weight loss is at a higher temperature as the aromatic or aromatic-like group is incorporated in molecular structures. This is especially clear for the results under an $N_2$ atmosphere. Accordingly, the results illustrated in FIG. 4 and FIG. 5 demonstrate the unexpected advantages to be obtained by increasing the aromatic character of lubricants, especially when the aromaticity is provided by incorporating PAH constituents into the lubricant.

Synthetic Pathways

There are several synthetic pathways to obtain PAH containing lubricants. Among them, the below example is a substitution reaction with a halogenated PAH compound. An example is the synthesis of halogenated pyrene with a perfluoroalkylated compound having hydroxyl end groups:

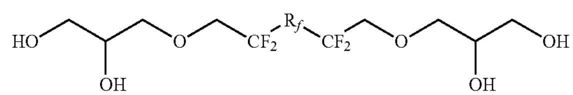

$R_f$: $-CF_2O(CF_2CF_2O)_nCF_2-$,
where n is from 1 to 100

+

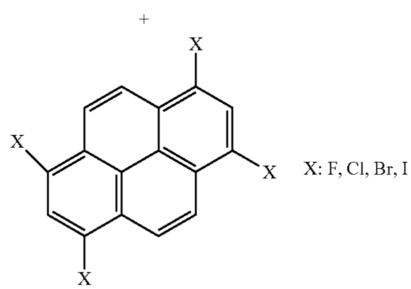

X: F, Cl, Br, I

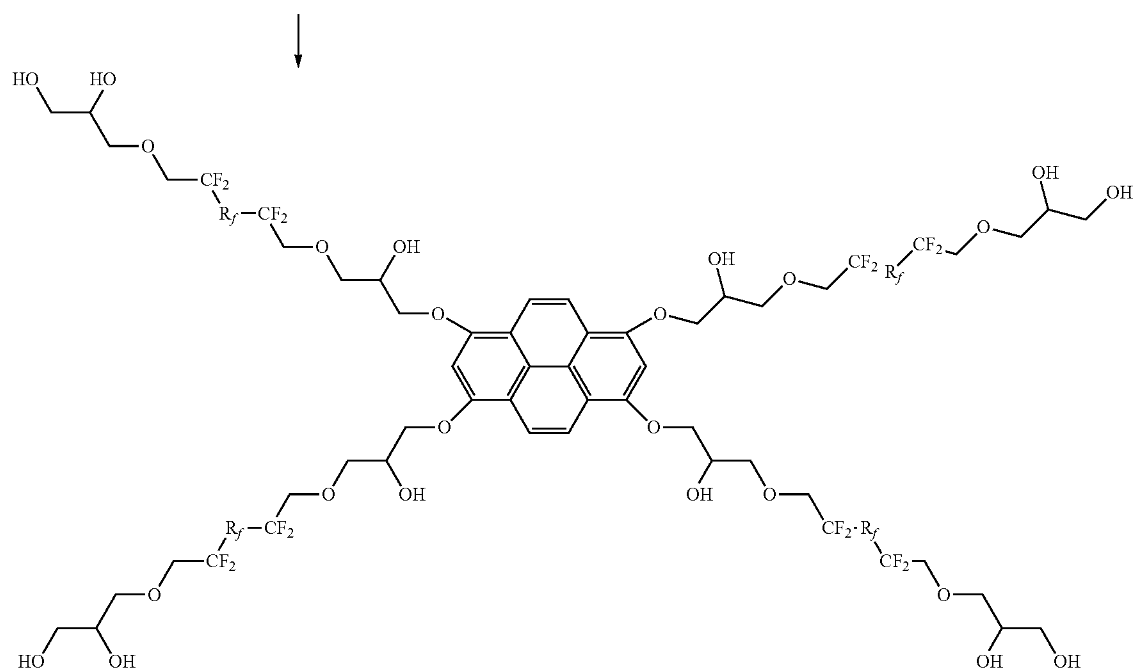

The PAH group is not restricted to pyrene, but may be naphthalene, phenalene, phenanthrene, triphenylene or the other aromatic materials set forth in Table 1.

Using halogenated PAH as a non-limiting example, there are a number of commercially available halogenated PAH compounds, and some examples are:

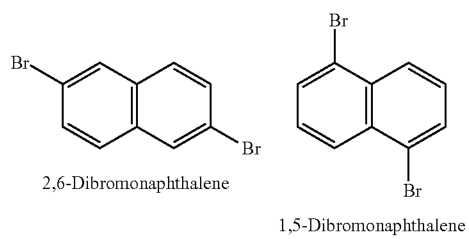

2,6-Dibromonaphthalene 1,5-Dibromonaphthalene

-continued

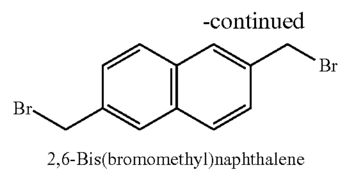

2,6-Bis(bromomethyl)naphthalene

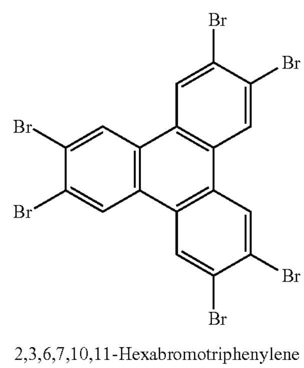

2,3,6,7,10,11-Hexabromotriphenylene

-continued

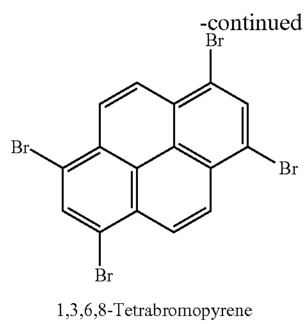

1,3,6,8-Tetrabromopyrene

The disclosure is not limited to brominated compounds, and other halogenated compounds may be used, such as chlorides or iodides. The brominated compounds above can thus also be substituted with some of these halides.

An exemplary pathway for placing an aromatic moiety at the end of the perfluoroalkyl ether chain of a PAH centered lubricant can also be achieved by substitution, as shown in this example:

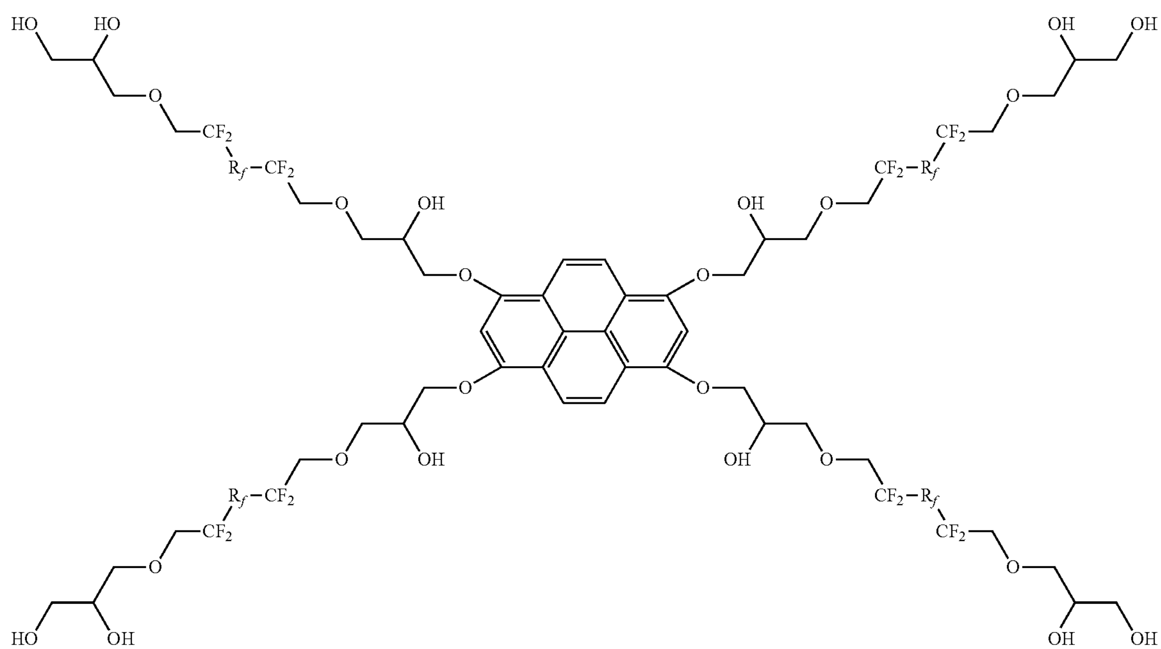

$R_f$: $-CF_2O(CF_2CF_2O)_nCF_2-$ , where n is from 1 to 100

+

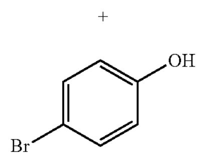

-continued

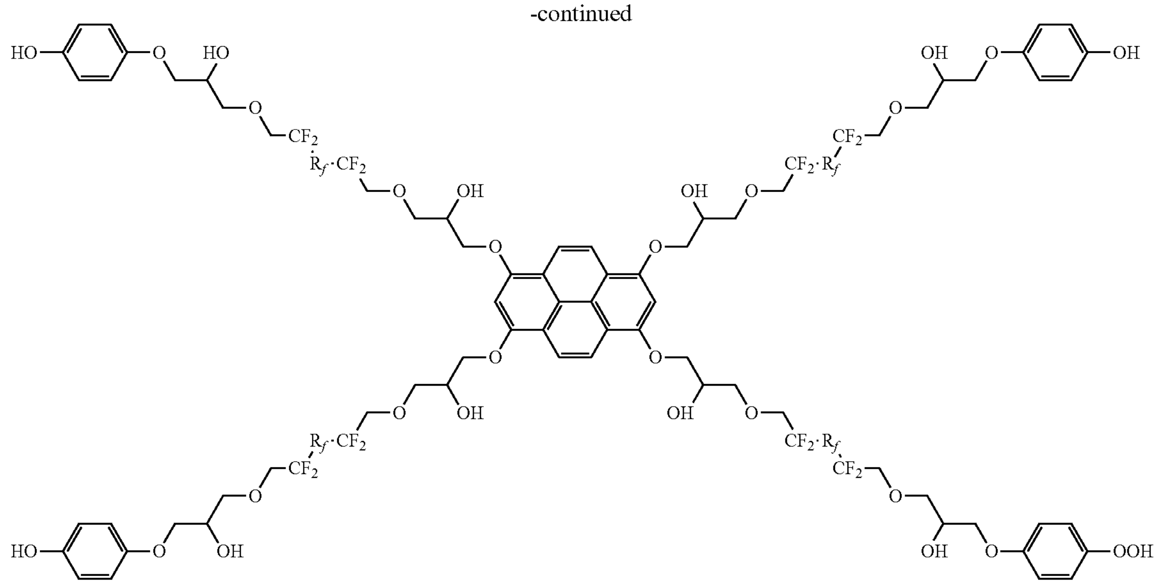

The PAH group is not restricted to pyrene, but may be naphthalene, phenalene, phenanthrene, triphenylene or the other aromatic materials set forth in Table 1. The alcohol is not restricted to 4-bromophenol, but any suitable aromatic halogenated alcohol may be used, including 4-fluorophenol, 4-chlorophenol and 4-iodophenol. Other benzylic alcohols can also be used including 4-fluorobenzyl alcohol, 4-chlorobenzyl alcohol, 4-bromobenzyl alcohol and 4-iodobenzyl alcohol.

An overall synthetic pathway to obtain PAH centered lubricants can involve the reaction of an epoxide with an alcohol where reactive nucleophiles react with epoxides in an $S_N2$ type of reaction. Reactive nucleophiles are usually anions so the reaction conditions are essentially basic. The leaving group is the oxygen atom of the epoxide in the form of the alkoxide which is converted to the alcohol on an acidic work-up. In this case, a perfluorinated diol reacts with an epoxidated PAH to achieve a PAH centered perfluorinated lubricant:

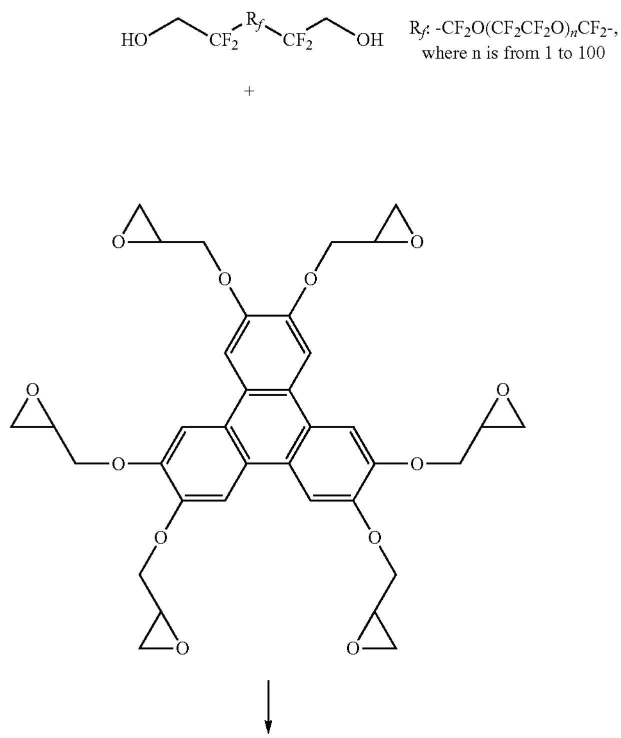

-continued
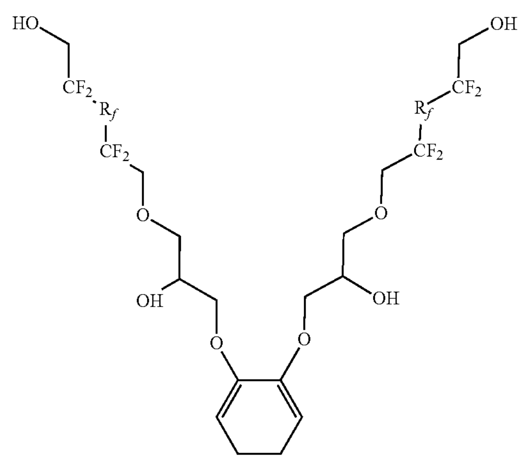
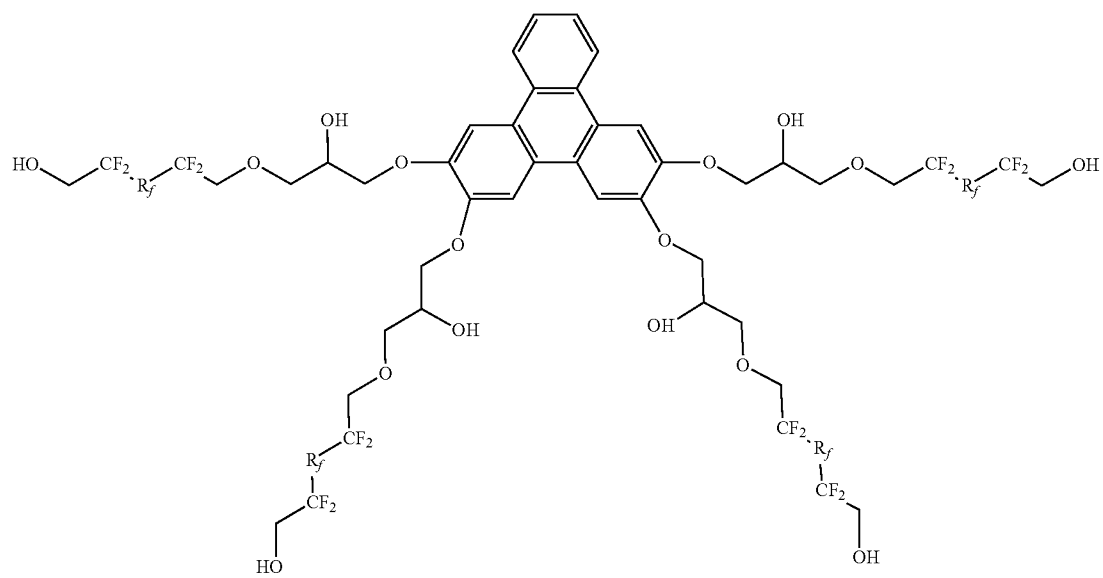

A further exemplary substitution reaction with an alkylated aromatic compound can yield a lubricant with aromatic character at the end of the perfluoroalkyl ether side chains:
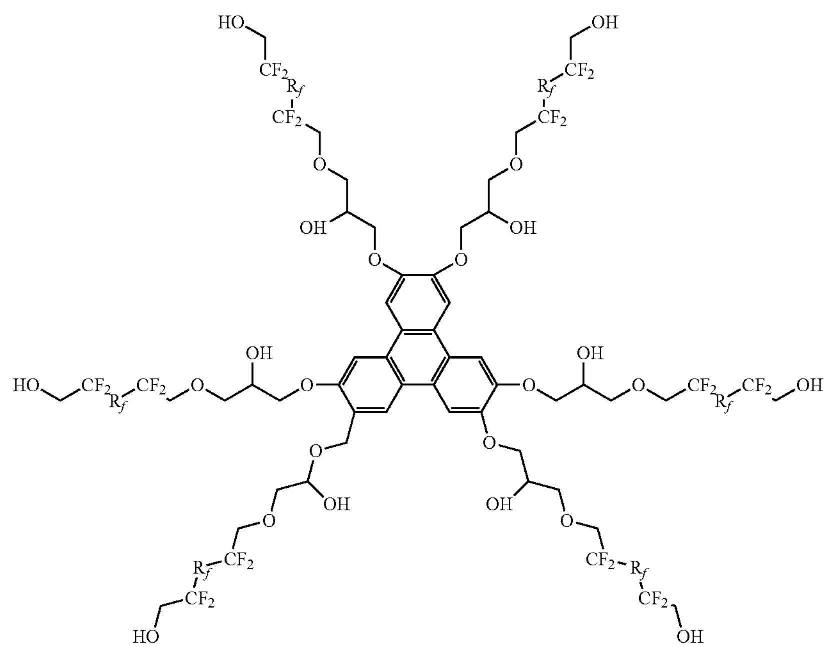
+
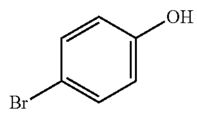
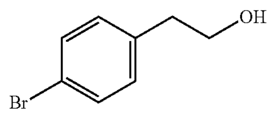
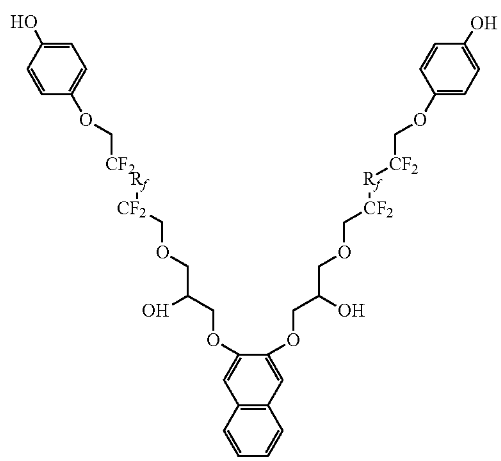

-continued

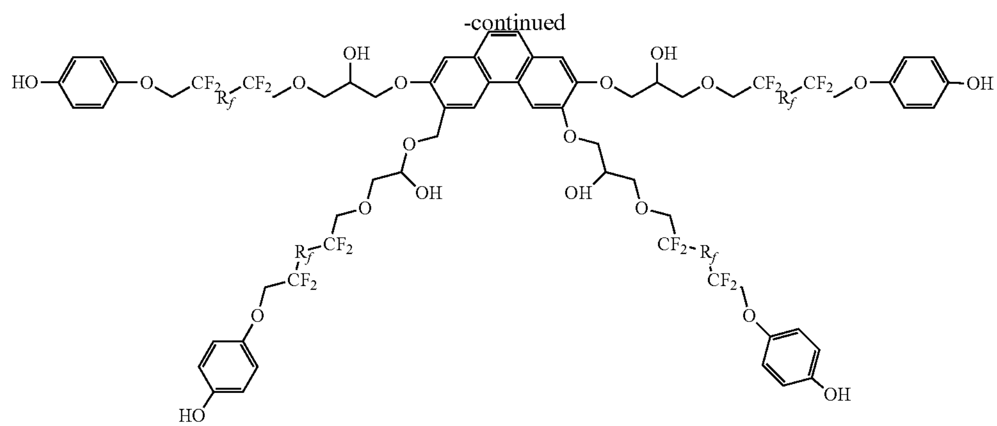

The PAH group is not restricted to pyrene, but may be naphthalene, phenalene, phenanthrene, triphenylene or the other aromatic compounds set forth in Table 1. The alcohol is not restricted to 4-bromophenol, but any suitable aromatic halogenated alcohol may be used, including 4-fluorophenol, 4-chlorophenol and 4-iodophenol. Other benzylic alcohols can also be used including 4-fluorobenzyl alcohol, 4-chlorobenzyl alcohol, 4-bromobenzyl alcohol and 4-iodobenzyl alcohol.

Application of Lubricant

In various aspects, the lubricant layer can be formed on the magnetic recording medium, specifically on the protective overcoat, via a dip coating method. For instance, in one aspect, the magnetic recording medium may be dipped into a lubricant bath including the perfluoropolyether (PFPE)-based lubricant according to one or more aspects of the disclosure and a specialty solvent such as VERTREL-XF (1,1,1,2,3,4,4,5,5,5-Decafluoropentane). After a predetermined amount of time, the magnetic recording medium may be removed from the lubricant bath at a controlled rate. The solvent then evaporates, leaving behind a lubricant layer comprising the molecular thin lubricant according to one aspect of the disclosure. The percentage of the lubricant remaining on the surface of the magnetic recording medium after disposition of the lubricant may be referred to as the bonded percentage or the bonding percentage. The bonding percentage may be quantified for various time periods by exposing the lubricated magnetic recording medium with the solvent used in the lubricant bath.

In one aspect, the thickness of the lubricant layer may be tuned by controlling the submergence duration of the magnetic recording medium in the lubricant bath, the rate at which the magnetic recording medium is removed from the coating solution, and/or the concentration of the lubricant, according to one or more aspects of the disclosure, in the lubricant bath.

In one or more aspects, the concentration of lubricant in the lubricant bath may be in a range from about 0.0001 g/L to about 100 g/L. In yet other aspects, the concentration of the lubricant in the lubricant bath may be selected so as to achieve a resulting lubricant layer with a thickness down to the nanometer level.

It is important to note that formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art upon reading the present disclosure. In addition, the magnetic recording layer, the protective overcoat, and/or any of the other layers of the media (e.g., including each of the layers shown for media 200 in FIG. 2) may be formed using any of numerous deposition methods that are known in the art.

It should be noted that methodology presented herein for at least some of the various aspects may be implemented, in whole or in part, in computer hardware, by hand, using specialty equipment, and/or the like, and combinations thereof.

Moreover, any of the structures and/or steps may be implemented using known materials and/or techniques, as would become apparent to one skilled in the art upon reading the disclosure.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also include some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 20% of the reference value. For example, a thickness of about 10 nm refers to a thickness of 10 nm±2 nm, e.g., from 8 nm to 12 nm in this example.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at." The term "and/or" refers to both the inclusive "and" case and the exclusive "or" case, and such term is used herein for brevity. For example, a composition formed from "A and/or B" may be A alone, B alone, or both A and B.

Various components described in this specification may be described as "including" and/or made of, and/or "having" certain materials, properties, or compositions of material(s). In one aspect, this can mean that the component has certain materials, properties, or compositions of materials. In another aspect, this can mean that the component has certain materials, properties, or compositions of material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other.

It is further noted that the term "over" and/or the term "on" as used in the disclosure in the context of one component located over another component, or in the context of one component located on another component, may be used to mean a component that is directly on a surface of another component e.g., disposed in physical contact with the surface of the other component, and/or in another component, e.g., directly embedded in a component. Thus, for example, a first component that is over or on the second component may mean that (1) the first component is located over or above the second component, but not directly touching the second component, (2) the first component is directly on (e.g., directly on a surface of) the second component, and/or (3) the first component is in (e.g., embedded in) the second component.

In the disclosure various ranges in values may be specified, described and/or claimed. Note that any time a range is specified, described and/or claimed in the specification and/or claim, it is meant to include the endpoints (at least in one aspect). In another aspect, the range may not include the endpoints of the range. In the disclosure various values (e.g., value X) may be specified, described and/or claimed. In one aspect, it should be understood that the value X may be exactly equal to X. In one aspect, it should be understood that the value X may be "about X," with the meaning noted above. Likewise, when a value is determined according to an equation, it is to be understood that in one aspect, the value is equal to the value calculated according to the equation and in another aspect, the value is about equal to the value calculated according to the equation according to the meaning noted above, or as is expressly provided for, e.g., plus or minus (±) a specific amount.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A lubricant configured to be adsorbed by a magnetic recording medium, comprising:

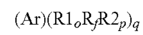

$$(Ar)(R1_oR_fR2_p)_q$$

where

Ar is a polyaromatic hydrocarbon ring system,

R1 is a moiety containing a first polar group,

R2 is a moiety containing a second polar group, $R_f$ is a perfluorinated polyether, is from 1 to 10, p is from 0 to 10, and q is from 2 to 10.

2. The lubricant of claim 1, wherein the first polar group comprises at least one selected from the group consisting of hydroxyl, phosphonic acid, silanol and carboxylic acid.

3. The lubricant of claim 1, wherein the second polar group comprises at least one selected from the group consisting of hydroxyl, phosphonic acid, silanol and carboxylic acid.

4. The lubricant of claim 1, wherein $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

5. The lubricant of claim 1, wherein $R_f$ is $—CF_2O(CF_2CF_2O)_sCF_2—$, and s is from 1 to 100.

6. The lubricant of claim 1, wherein Ar is selected from the group consisting of naphthalene, phenalene, B phenanthrene, pyrene, and triphenylene.

7. The lubricant of claim 1, having the formula:
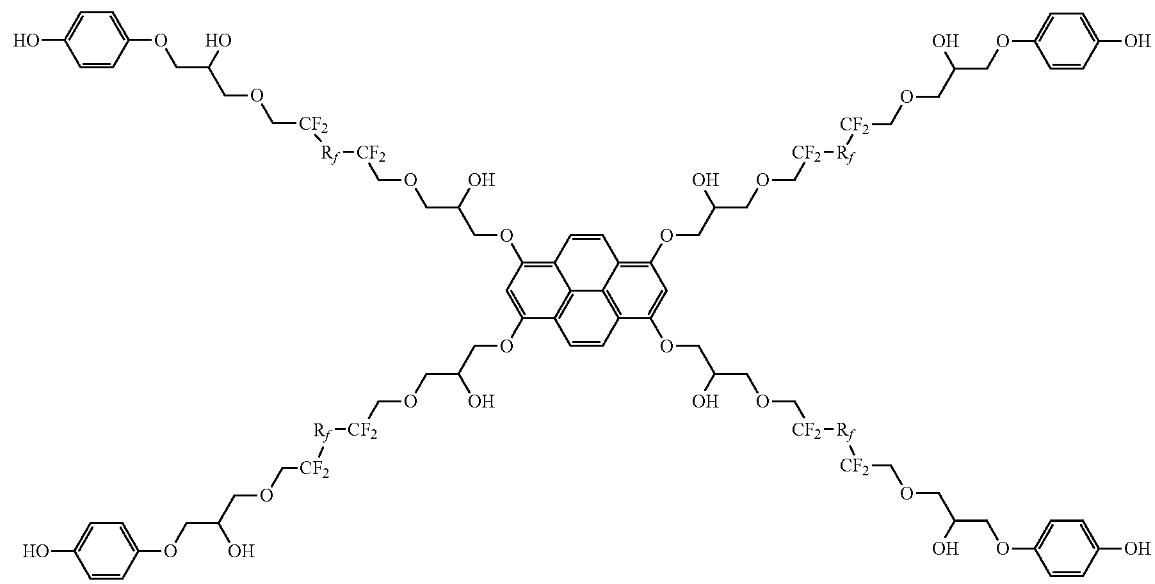
where $R_f$ is $CF_2O(CF_2CF_2)_nCF_2$— where n is from 1 to 100 or $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

8. The lubricant of claim 1, having the formula:

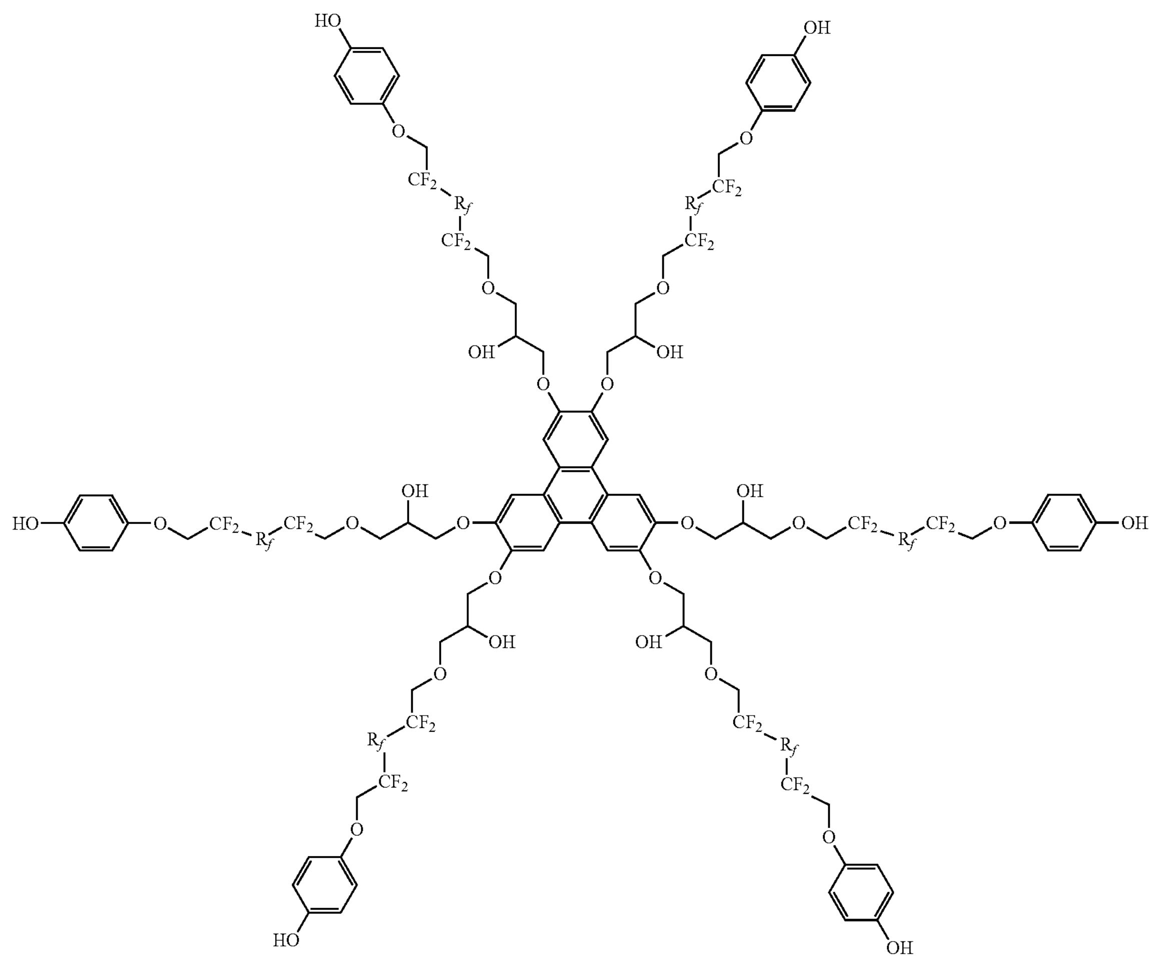

where $R_f$ is $CF_2O(CF_2CF_2)_nCF_2$— where n is from 1 to 100 or $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

9. The lubricant of claim 1, wherein p is from 1 to 10.

10. A data storage device configured for magnetic recording, comprising:

a magnetic recording medium comprising:

a substrate;

a magnetic recording layer on the substrate;

an overcoat layer on the magnetic recording layer; and the lubricant of claim 1 adsorbed by the overcoat layer.

11. The data storage device of claim 10, wherein $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

12. The data storage device of claim 10, wherein $R_f$ is $—CF_2O(CF_2CF_2O)_sCF_2—$, and s is from 1 to 100.

13. The data storage device of claim 10, wherein Ar is selected from the group consisting of naphthalene, phenalene, phenanthrene, pyrene, and triphenylene.

14. The data storage device of claim 10, wherein the lubricant has the formula:
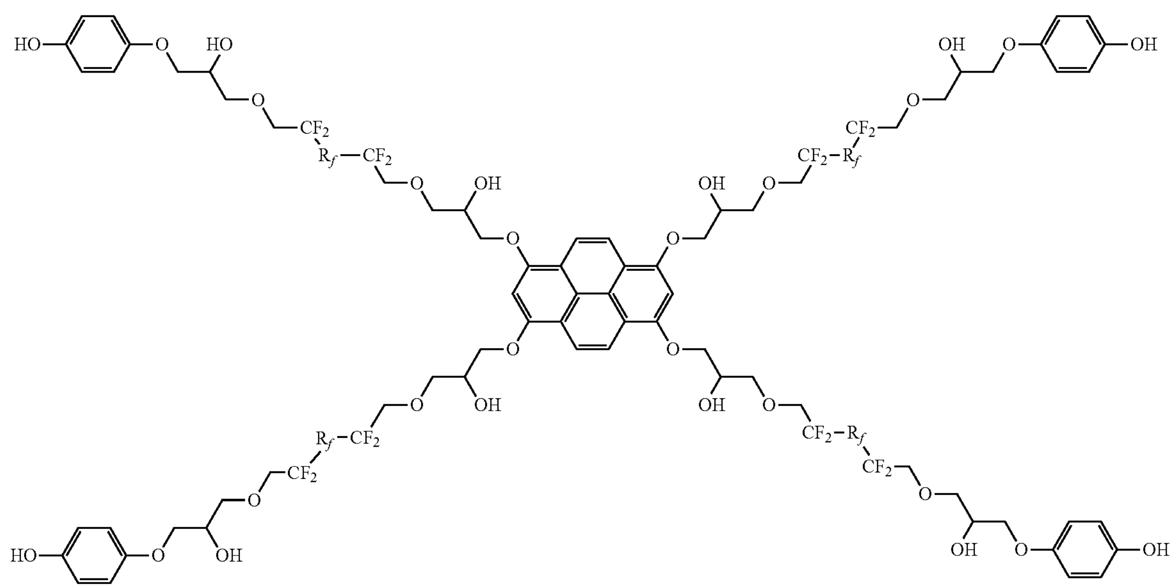
where $R_f$ is $CF_2O(CF_2CF_2)_nCF_2$— where n is from 1 to 100 or $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

15. The data storage device of claim 10, wherein the lubricant has the formula:

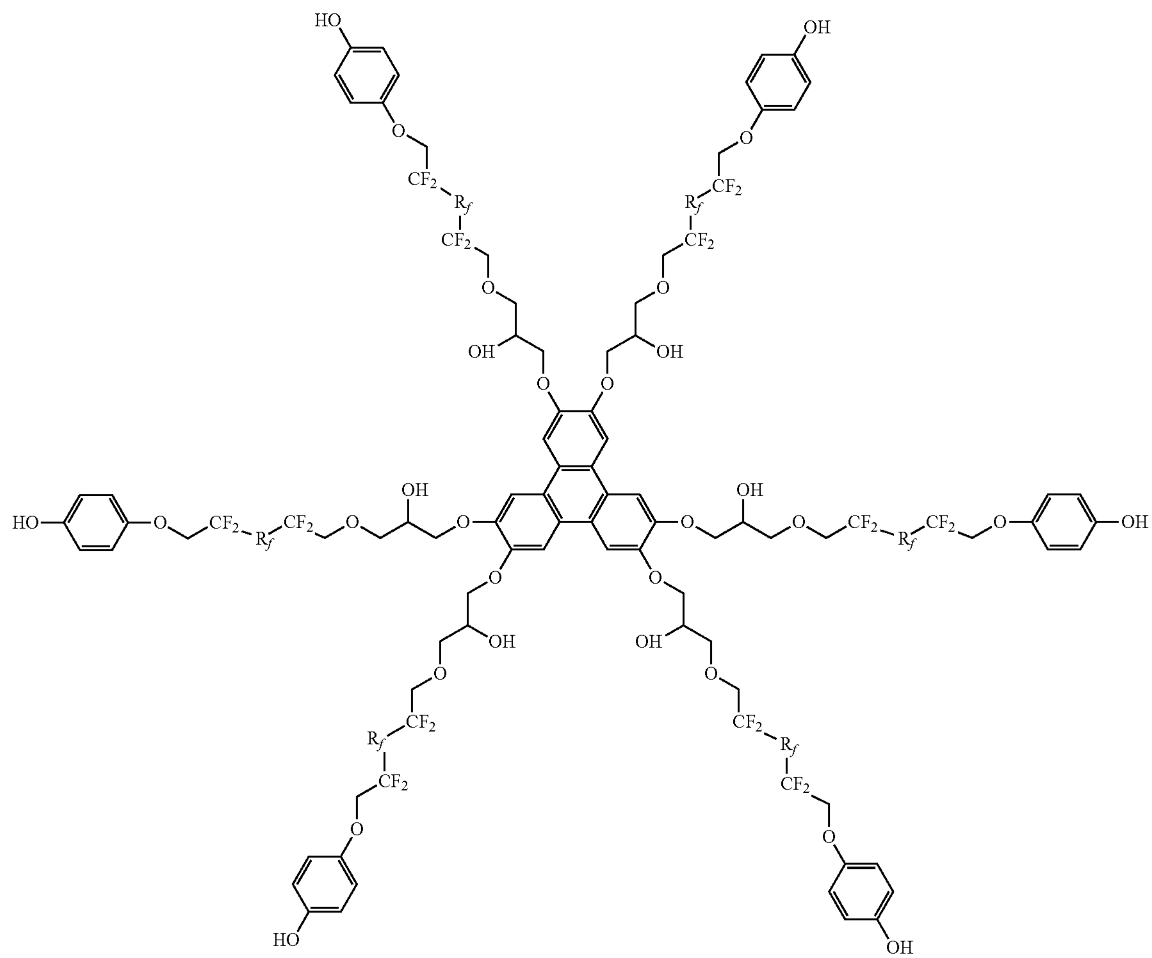

where $R_f$ is $CF_2O(CF_2CF_2)_nCF_2$— where n is from 1 to 100 or $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$, and r, s are independently from 1 to 100.

16. A magnetic recording medium, comprising:

a substrate;

a magnetic recording layer on the substrate;

an overcoat layer on the magnetic recording layer; and the lubricant of claim 1 adsorbed by the overcoat layer.

17. A data storage system, comprising;

at least one magnetic head;

a magnetic recording medium coated with a layer of the lubricant according claim 1;

a drive mechanism for positioning the at least one magnetic head over the magnetic recording medium; and a controller electrically coupled to the at least one magnetic head for controlling operation of the at least one magnetic head.

18. A data storage system, comprising:

a slider comprising at least one magnetic head and an air bearing surface, wherein a thin film of the lubricant according to claim 1 is disposed on the air bearing surface; and a magnetic recording medium including a magnetic recording layer; and wherein the slider is configured to write information to the magnetic recording layer using heat assisted magnetic recording, energy assisted magnetic recording, or microwave assisted magnetic recording.

19. A lubricant configured to be adsorbed by a magnetic recording medium, comprising:

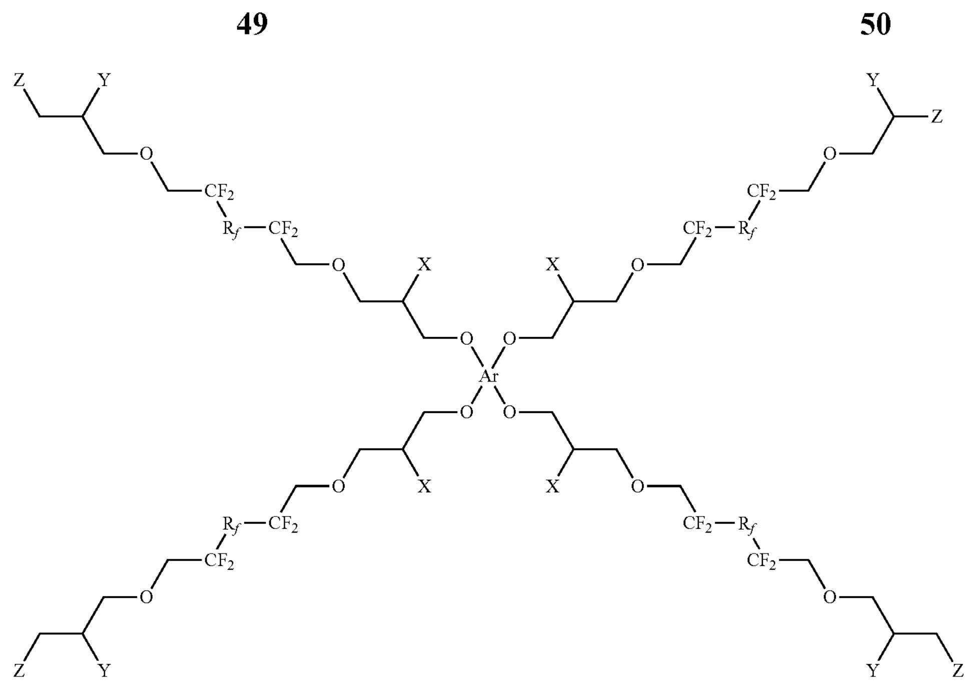

where Ar is a polyaromatic hydrocarbon ring system, X, Y and Z are independently hydroxyl, a phosphoric acid moiety, a silanol or a carboxylic acid moiety, and where $R_f$ is $CF_2O(CF_2CF_2)_nCF_2$— where n is from 1 to 100 or $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, $—CF_2O(CF_2CF_2O)_sCF_2—$, and r, s are independently from 1 to 100.

20. The lubricant of claim 19, wherein Ar is selected from the group consisting of naphthalene, phenalene, phenanthrene, pyrene, and triphenylene.

21. A method of synthesizing a lubricant, comprising: reacting 4-bromophenol with where

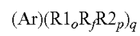

$(Ar)(R1_oR_fR2_p)_q$

Ar is a polyaromatic hydrocarbon ring system,
R1 is a moiety containing a first polar group,
R2 is a moiety containing a second polar group,
$R_f$ is a perfluorinated polyether,
is from 1 to 10,
p is from 0 to 10, and
q is from 2 to 10.

22. The method of claim 21, wherein $R_f$ is $CF_2O(CF_2CF_2)_n CF_2$— where n is from 1 to 100.

23. The method of claim 21, wherein $R_f—CF_2CF_2O(CF_2CF_2CF_2CF_2O)_sCF_2CF_2—$, $—CF_2CF_2O(CF_2CF_2CF_2O)_s CF_2CF_2—$, $—CF_2CF_2O[CF(CF_3)CF_2O]_sCF_2CF_2—$, $—CF_2O(CF_2CF_2O)_r(CF_2O)_sCF_2—$, $—CF_2O(CF_2CF_2O)_s CF_2—$, and r, s are independently from 1 to 100.

24. The method of claim 21, wherein the first polar group is selected from the group consisting of hydroxyl, phosphonic acid, silanol or carboxylic acid.

25. The method of claim 21, wherein p is from 1 to 10.

* * * * *